US012707066B2

(12) United States Patent
Arumugam et al.

(10) Patent No.: US 12,707,066 B2
(45) Date of Patent: Aug. 11, 2026

(54) APPLICATIONS OF TEMPLATE MATCHING WITH FUSION TECHNIQUES IN VIDEO CODING

(71) Applicant: DOLBY LABORATORIES LICENSING CORPORATION

(72) Inventors: Jeeva Raj Arumugam, Rasipuram (IN); Ashwin Natesan, Bangalore (IN); Vaibhav Pandurang Valvaiker, Bangalore (IN); Jay Nitin Shingala, Bangalore (IN); Taoran Lu, Santa Clara, CA (US); Fangjun Pu, Sunnyvale, CA (US); Peng Yin, Ithaca, NY (US); Gary J. Sullivan, Bellevue, WA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 19/138,095

(22) PCT Filed: Dec. 18, 2023

(86) PCT No.: PCT/US2023/084513
§ 371 (c)(1),
(2) Date: Jun. 11, 2025

(87) PCT Pub. No.: WO2024/137443
PCT Pub. Date: Jun. 27, 2024

(65) Prior Publication Data

US 2026/0019599 A1 Jan. 15, 2026

(30) Foreign Application Priority Data

Dec. 22, 2022 (IN) ............................ 202241074544
Mar. 9, 2023 (IN) ............................ 202341015710
Jun. 28, 2023 (IN) ............................ 202311043462

(51) Int. Cl.
*H04N 19/159* (2014.01)
*H04N 19/176* (2014.01)
*H04N 19/70* (2014.01)

(52) U.S. Cl.
CPC ......... *H04N 19/159* (2014.11); *H04N 19/176* (2014.11); *H04N 19/70* (2014.11)

(58) Field of Classification Search
CPC ..... H04N 19/159; H04N 19/176; H04N 19/70
(Continued)

(56) References Cited

U.S. PATENT DOCUMENTS

2019/0335181 A1* 10/2019 Abe .................... H04N 19/139
2020/0382778 A1* 12/2020 Mao .................... H04N 19/159
2024/0275945 A1* 8/2024 Lim ...................... H04N 19/70

OTHER PUBLICATIONS

"Versatile Video Coding," Rec. ITU-T H.266, Aug. 2020, pp. 1-516.
(Continued)

*Primary Examiner* — Joseph G Ustaris
*Assistant Examiner* — Jimmy S Lee

(57) ABSTRACT

Methods and systems are described for intra-prediction using template matching (TM) in video coding. The proposed methods include adaptive fusion when using template-based intra mode derivation using the most probable modes (TIMD), and fusion in intra mode prediction with template matching (Intra TMP).

14 Claims, 14 Drawing Sheets

(58) Field of Classification Search
USPC .................................................... 348/240.02
See application file for complete search history.

(56) References Cited

OTHER PUBLICATIONS

Arumugam et al., "AHG12: Fusion of Intra Template Matching," Joint Video Experts Team (JVET) of ITU-T SG 16 WP 3 and ISO/IEC JTC 1/SC 29 29th Meeting, by teleconference, Jan. 11-20, 2023, Document: JVET-AC0107-v2, pp. 1-5.
Cao et al., "EE2-related: Fusion for template-based intra mode derivation," Joint Video Experts Team (JVET) of ITU-T SG 16 WP 3 and 1S0/IEC JTC 1/SC 29 23rd Meeting, by teleconference, Jul. 7-16, 2021, Document: JVET-W0123-v2, pp. 1-4.
Coban et al., "Algorithm description of Enhanced Compression Model 6 (ECM 6)," Joint Video Experts Team (JVET) of ITU-T SG 16 WP 3 and ISO/IEC JTC 1/SC 29 27th Meeting, by teleconference, Jul. 13-22, 2022, Document: JVET-AA2025, pp. 1-53.
Li et al., "Non-EE2: Intra TMP with half-pel precision," Joint Video Experts Team (JVET) of ITU-T SG 16 WP 3 and ISO/IEC JTC 1/SC 2929th Meeting, by teleconference, Jan. 11-20, 2023, Document: JVET-AC0087-v2.
Naser et al., "EE2-1.14: IntraTMP adaptation for camera-captured content," Joint Video Experts Team (JVET) of ITU-T SG 16 WP 3 and ISO/IEC JTC 1/SC 29 28th Meeting, Mainz, DE, Oct. 20-28, 2022, Document: JVET-AB0130, pp. 1-3.
Wang et al., "Non-EE2: Fuse intra template matching prediction with intra prediction," Joint Video Experts Team (JVET) of ITU-T SG 16 WP 3 and ISO/IEC JTC 1/SC 29 29th Meeting, by teleconference, Jan. 11-20, 2023, Document: JVET-AC0170-v3, pp. 1-2.
Xu et al., "CE8: Summary Report on Current Picture Referencing," Joint Video Experts Team (JVET) of ITU-T SG 16 WP 3 and 1S0/IEC JTC 1/SC 29/WG 11 12th Meeting: Macao, CN, Oct. 3-12, 2018, Document: JVET-L0028-vl, pp. 1-13.
Zhang et al., "Hybrid Angular Intra/Template Matching: Prediction for I-IEVC Intra Coding," © 2015 IEEE, IEEE VCIP 2015, pp. 1-4.

* cited by examiner

APPLICATIONS OF TEMPLATE MATCHING WITH FUSION TECHNIQUES IN VIDEO CODING

CROSS-REFERENCE TO RELATED APPLICATIONS

This application is a U.S. National Stage application under U.S.C. 371 of International Application No. PCT/US2023/084513, filed on 18 Dec. 2023, which claims the benefit of priority from Indian Provisional Patent Application No. 202311043462, filed on Jun. 28, 2023, Indian Provisional Patent Application No. 202341015710, filed on Mar. 9, 2023, and Indian Provisional Patent Application No. 202241074544, filed on Dec. 22, 2022, each of which is incorporated by reference in its entirety.

TECHNOLOGY

The present document relates generally to images and video coding. More particularly, an embodiment of the present invention relates to applications of template matching with fusion techniques in video coding.

BACKGROUND

In 2020, the MPEG group in the International Standardization Organization (ISO), jointly with the International Telecommunications Union (ITU), released the first version of the Versatile Video Coding Standard (VVC), also known as H.266 (Ref. [1]). More recently, the same group has been working on the development of the next generation coding standard that provides improved coding performance over existing video coding technologies. As part of this investigation, new coding techniques are also examined.

As appreciated by the inventors here, improved techniques for applying template matching in image and video coding are desired, and they are described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Example embodiments that relate to applying template matching in video coding are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to applying template matching (TM) in image and video coding for intra prediction. The proposed methods include: applying adaptive fusion in template-based intra mode derivation using most probable modes (MPM) (TIMD), and applying fusion in intra-mode template matching (Intra TMP). Example embodiments include also methods for intra TMP fusion with sub-pel precision, and fusion of intra TMP with intra prediction.

Template Matching in Video Coding

Figure 1:
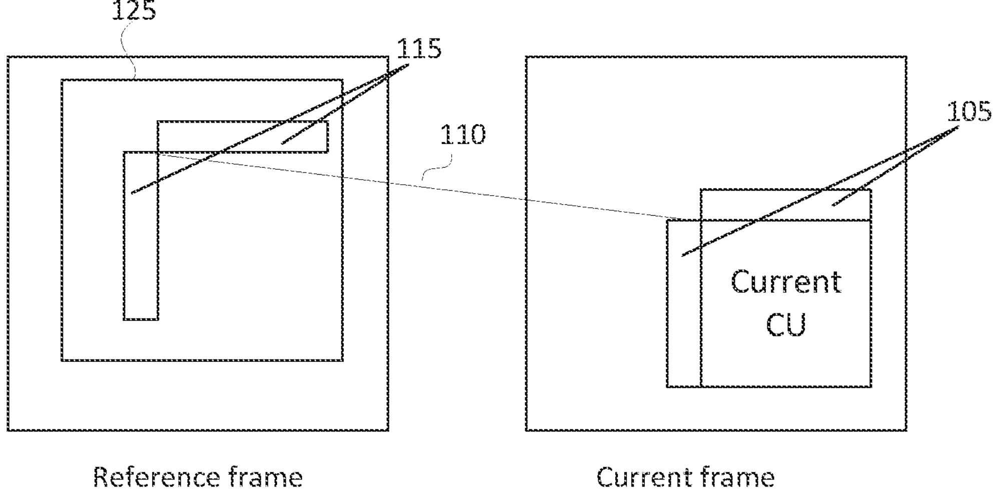
FIG. 1 depicts an example of template matching in video coding.

FIG. 1 depicts an example of template matching (TM) in video coding (Ref. [2]). The term “template matching” refers to a decoder-side, motion vector (MV) derivation method to refine the motion information of the current coding unit (CU) by finding the closest match between a template (i.e., top and/or left neighbouring blocks (105) of the current CU) in the current picture and a block (i.e., same size to the template) in a reference picture. As illustrated in FIG. 1, in an embodiment, given an initial motion vector (110), a better MV is to be searched around the initial motion vector of the current coded unit (CU) within a [−8, +8]-pel search range (125). The search step size is determined based on the advanced motion vector resolution (AMVR) mode and TM can be cascaded with a bilateral matching process in merge modes.

In advanced motion vector prediction (AMVP) mode, a motion vector predictor (MVP) candidate is determined based on template matching error to pick up the one which reaches the minimum difference between the current block template (105) and the reference block template (115), and then TM performs only for this particular MVP candidate for MV refinement. TM refines this MVP candidate, starting from full-pel motion vector difference (MVD) precision (or 4-pel for 4-pel AMVR mode) within a [−8, +8]-pel search range (125) by using an iterative diamond search. The AMVP candidate may be further refined by using cross search with full-pel MVD precision (or 4-pel for 4-pel AMVR mode), followed sequentially by half-pel and quarter-pel ones depending on the AMVR mode. This search process ensures that the MVP candidate continues to keep the same MV precision as indicated by the AMVR mode after the TM process.

In merge mode, a similar search method is applied to the merge candidate indicated by the merge index. TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

Intra Template Matching Prediction (Intra TMP)

In the enhanced compression model (ECM) software implementation. e.g., ECM versions 6 or 7 (Ref. [2]). Intra template matching prediction (Intra TMP) is a special intra prediction mode that copies the best prediction block (e.g., 312) from the reconstructed part of the current frame, whose L-shaped template (310) matches the current template (305). For a predefined search range, the encoder searches for the most similar template to the current template in a reconstructed part of the current frame and uses the corresponding block (312) as a prediction block. The encoder then signals the usage of this mode, and the same prediction operation is performed at the decoder side.

Figure 3:
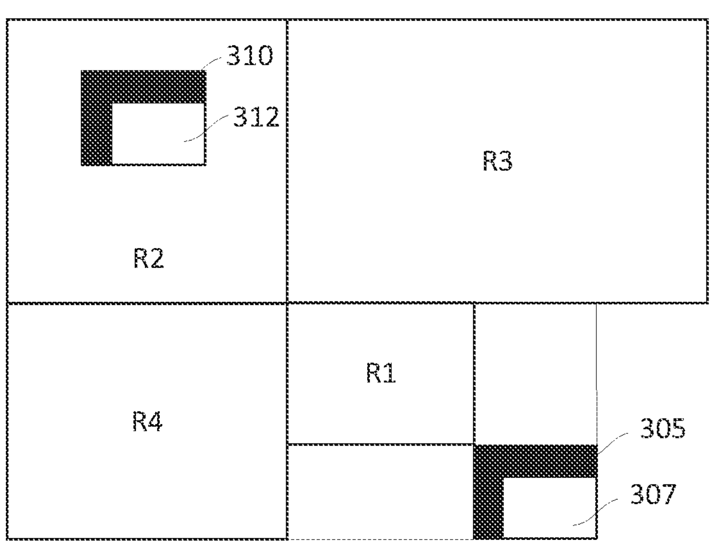
FIG. 3 depicts an example of Intra Template matching prediction (Intra TMP)

The prediction signal is generated by matching the L-shaped causal neighbor (305) of the current block (307) with the L-shaped neighbor (310) of another block (e.g., 312), denoted as the matching block, in a predefined search area (R1-R4), as shown in FIG. 3, consisting of:

R1: the current CTU

R2: the top-left CTU

R3: the above CTU

R4: the left CTU

Typically, the sum of absolute differences (SAD) is used as a cost function.

Within each region, the decoder searches for the template that has the least SAD with respect to the current one and uses its corresponding block as a prediction block.

To reduce the searching complexity (Ref. [4]), the search regions (R1 to R4) may be sub-sampled by a factor of 2. Then, after finding the best match, a refinement process is performed in which another template matching search is performed around the best match with a reduced search range.

Template-Based Intra Mode Derivation Using MPMs (TIMD) With Fusion

Figure 2:
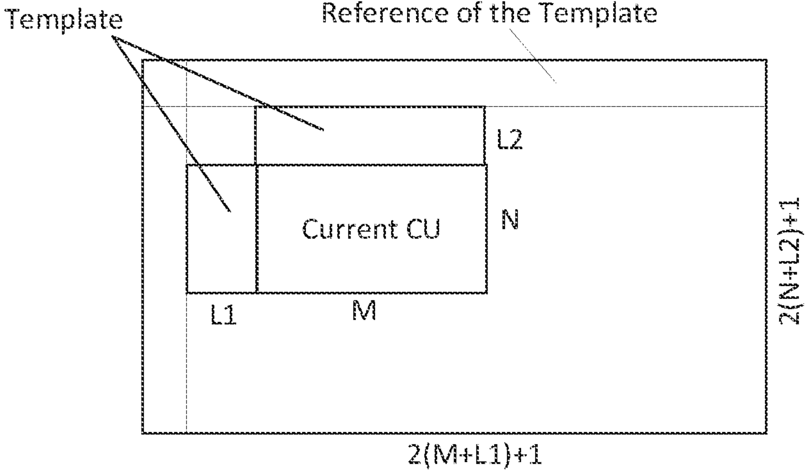
FIG. 2 depicts an example of template-based derivation of Intra-mode using most probable modes (MPM) (TIMD)
Figure 6:
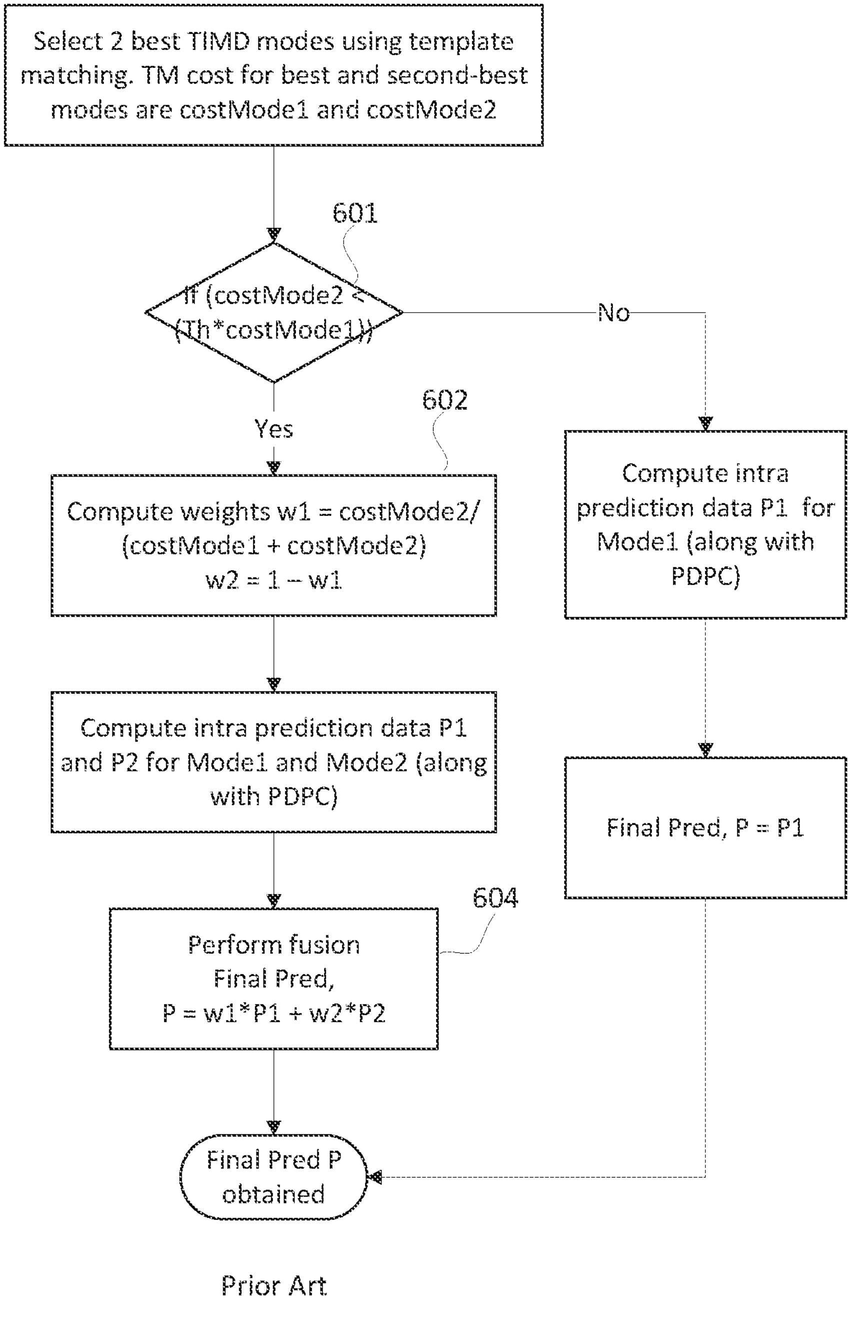
FIG. 6 depicts the process in TIMD with fusion as per ECM 6 (prior art)

In ECM 7 (Ref. [2]), for each intra prediction mode in the most probable modes (MPMs), the measured loss (e.g., SAD or the sum of absolute transformed differences (SATD)) between the prediction and reconstruction samples of the template is calculated, as shown in FIG. 2, where for an M×N coded unit (CU), two templates are used, one L1×N, and one M×L2. First, two intra prediction modes with the smaller SATD are selected as the TIMD modes (say, model and mode2). These two TIMD modes are fused with weights after applying a position-dependent prediction combination (PDPC) process, and such weighted intra prediction is used to code the current CU as depicted in FIG. 6 (Ref. [3]).

The costs of the two selected modes (e.g., costMode1 and costMode2) are compared using a cost factor threshold (Th). For example, in ECM 7, without limitation, a cost factor threshold of Th=2 is applied as follows:

First (step 601), check if:

$$\text{costMode2} < Th * \text{costMode1}.$$

If this condition is true, then fusion is applied, otherwise only model (the one with the minimum cost) is used.

Weights of the modes are computed from their SATD costs as follows (step 602):

$$w1 = \text{costMode2}/(\text{costMode1} + \text{costMode2}), \quad (1)$$

$$w2 = 1 - w1.$$

Final fusion prediction (step 604) is applied as follows:

$$\text{Final Intra } Pred,\ P = (w1 * P1 + w2 * P2), \quad (2)$$

where P1 and P2 are the intra predicted data corresponding to costMode1 and costMode2.

Example embodiments to improve TIMD with fusion and Intra TMP are described next.

Improved Fusion Techniques in TIMD with Fusion

Figure 8:
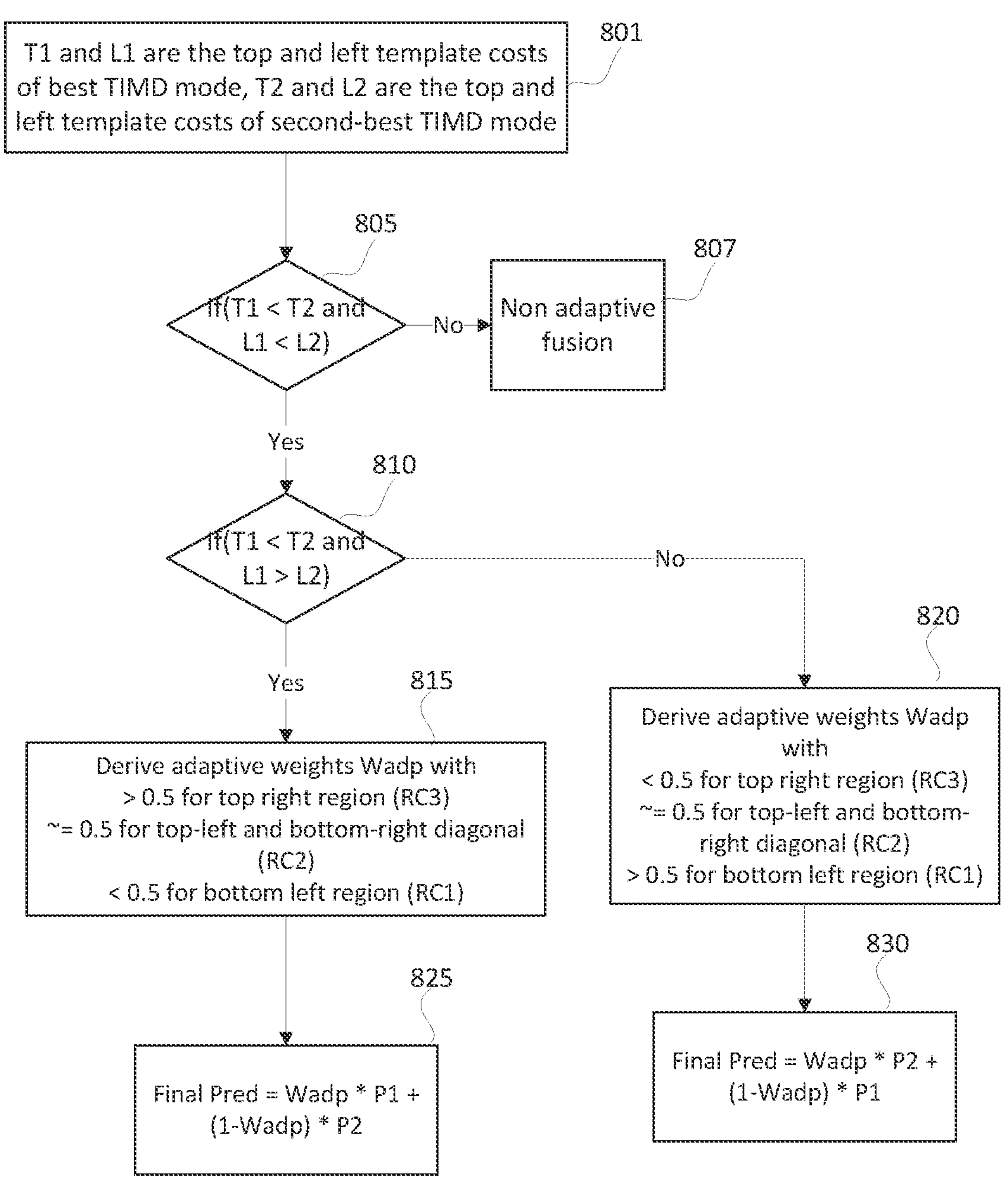
FIG. 8 depicts an example process of an adaptive fusion technique for TIMD and/or Intra TMP according to an embodiment of this invention.

In current ECM 7, for fusion in TIMD, the weights are derived based on the best TM total cost and the second-best TM total cost. Instead of using total cost to derive the weights, it is proposed to use the top and left template-costs adaptively to derive the weights for fusion as depicted in FIG. 8. The weights within a CU do not need to be uniform too. It can be adaptively decided.

Figure 4:
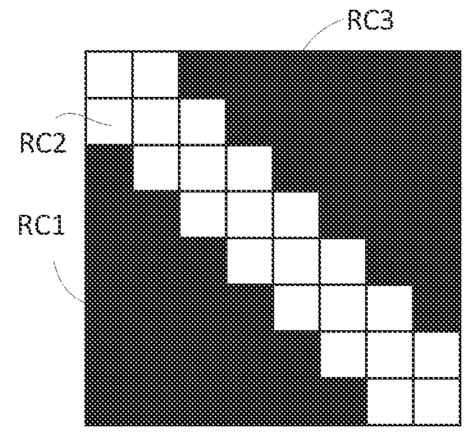
FIG. 4 depicts an example of adaptive weights regions within a CU according to an embodiment of this invention.

In an example embodiment:

a. (801) Assume T1 and L1 are the top and left template costs of the best TIMD mode (M1). T2 and L2 are the top and left template cost of the second best TIMD mode (M2). P1 and P2 are the intra predicted data corresponding to M1 and M2.

b. Condition for applying adaptive weights (805):
   If T1<T2 && L1<L2, then fusion adaptation (fusionAdpt) is true, otherwise fusionAdpt is false.
   If fusionAdpt is false, then use the non-adaptive weights as per equation (2) (807).

c. Adaptive weights for regions RC1 (bottom left), RC2 (diagonal pixels between bottom left and top right) and RC3 (top right) as depicted in FIG. 4 in the current CU are derived such that:

If fusionAdpt is true and T1<T2 && L1>L2, then, (step 815), weights for RC1 need to be below 0.5, weights for RC2 need to be around 0.5, and weights for RC3 need to be above 0.5: and (step 825).

Final Intra Prediction, P=(Wadp*P1+(1−Wadp)*P2), where Wadp denotes the fusion weights in each of the RC1, RC2, and RC3 regions.

If fusionAdpt is true and T1>T2 && L1<L2, then (step 820) weights for RC1 need to be above 0.5, weights for RC2 need to be around 0.5, and weights for RC3 need to be below 0.5; and (step 830).

Final Intra Pred, P=(Wadp*P2+(1−Wadp)*P1), wherein Wadp denotes the fusion weights in each of the RC1, RC2, and RC3 regions.

In one embodiment, adaptive weights for a current CU of size w×h are derived as follows $$wL(i, j) = 0.5 - cW * j + cH * i, \tag{3}$$

$$wT(i, j) = 0.5 + cW * j - cH * i, \tag{4}$$

where cH=0.25/h; cW=0.25/w. Indices j and i vary from 0 to w−1 and 0 to h−1.

If fusionAdpt is true and T1<T2 && L1>L2, use adaptive weights within CU of w×h as follows Final Intra Pred, $$P(i, j) = (wT(i, j) * P1 + wL(i, j) * P2). \tag{5}$$

If T1>T2 && L1<L2, use adaptive weights within CU of w×h as follows

Final Intra Pred, $$P(i, j) = (wL(i, j) * P1 + wT(i, j) * P2). \tag{6}$$

In another embodiment, all other processing steps remain same except that adaptive weights are derived using the following equations $$wL(i, j) = 1/2 + (1/(4*(h-i))) - (1/(4*(w-j))), \tag{7}$$

$$wT(i, j) = 1/2 - (1/(4*(h-i))) + (1/(4*(w-j))). \tag{8}$$

In another embodiment, all other processing steps remain same except that adaptive weights are derived using the following equations $$wL(i, j) = 0.5*(1/2 + (1/(4*(h-i))) - (1/(4*(w-j)))) + 0.25, \tag{9}$$

$$wT(i, j) = 0.5*(1/2 - (1/(4*(h-i))) + (1/(4*(w-j)))) + 0.25. \tag{10}$$

In another embodiment, the condition for enabling adaptive fusion can be derived as follows:

If T1<T2 && L1<L2 && (M1!=DC||M1!=Planar||M2!=DC||Mb2!=Planar), then fusionAdpt is true, otherwise fusionAdpt is false, where DC and Planar denote Intra modes.

Improved Intra Template Matching

Figure 5:
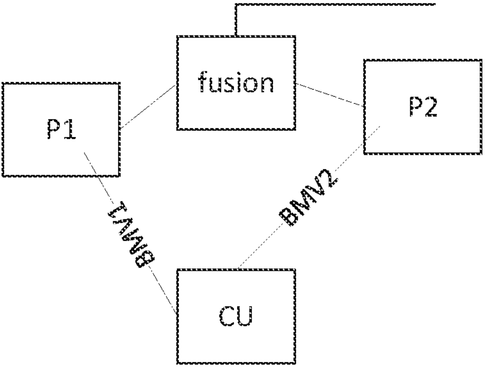
FIG. 5 depicts an example of adaptive fusion in Intra TMP according to an embodiment of this invention.
Figure 7:
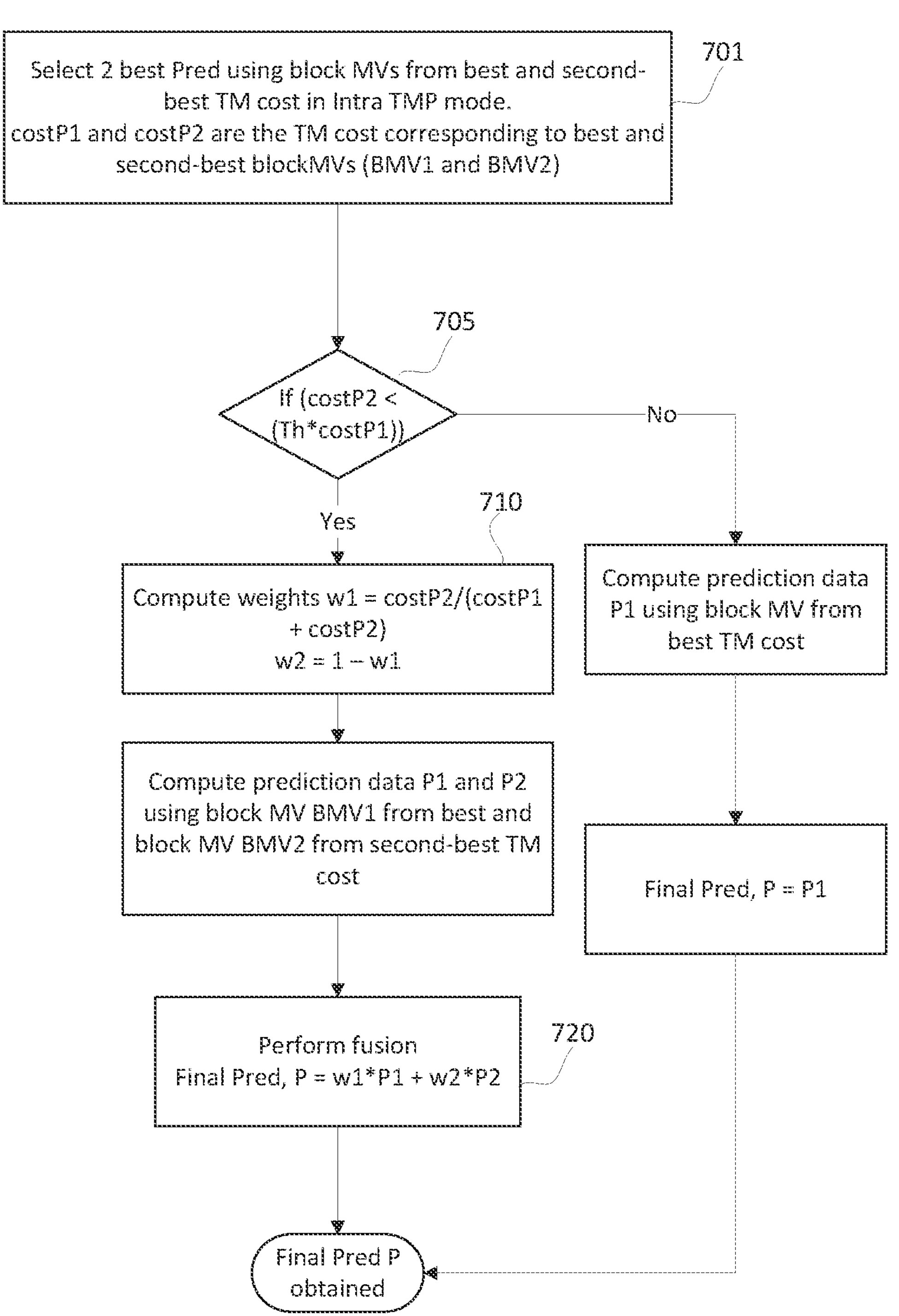
FIG. 7 depicts an example process of a fusion technique for Intra TMP according to an embodiment of this invention.

In ECM 7, Intra TMP uses a template cost to find the best match in the reference region. Only one predictor is used. In this disclosure, it is proposed to apply a fusion technique for intra TMP, as depicted in FIG. 5, with detailed steps shown in FIG. 7. In FIG. 5 and FIG. 7. P1 is the predicted data corresponding to the best match with the lowest TM cost and P2 is the predicted data corresponding to the second-best match with the second-lowest TM cost.

BMV1 and BMV2 are the block motion vectors corresponding to P1 and P2. In an embodiment, BMV2 and BMV1 are not equal.

As depicted in FIG. 7, in an example embodiment, the following steps are applied.

a. (Step 701) find the best two templates with the lowest cost and generate the two best predictors P1 and P2

In one embodiment, to reduce the complexity to find the best two matches, one can use sub-sampling for an initial search, and then search in the sub-sampled space without a second search refinement. In another embodiments, refinements may be applied to find the best two templates. For cost, SAD or SATD can be used. Alternatively, SAD can be applied for the initial search, and SATD can be applied for the second refinement.

b. (Step 705) decide whether to perform fusion

The fusion condition can be decided based on a threshold approach similar to the one used in TIMD with fusion.

if costP2<Th*costP1, then fusion is true; otherwise, fusion is false.

Th is some threshold greater than 1.0. (e.g., Th=2 or 1.5 or 1.2).

In a) (step 701) if a second refinement is not used, the second refinement can be applied to P1 only if fusion is false; or to both P1 and P2 if fusion is true.

c. If fusion is enabled, then determine the fusion weights (step 710)

The fusion weights can be uniform across a CU, and can be derived as follows (710)

$$w1 = \text{cost}P2/(\text{cost}P1 + \text{cost}P2)$$

$$w2 = 1 - w1$$

d. (step 720) Final fusion is applied as follows:

$$\text{Final } Pred,\ P = (w1 * P1 + w2 * P2)$$

In another embodiment, compute the fusion of the two reference templates corresponding to P1 and P2 as follows. Assume TP1 and LP1 are the top and left templates of the best block MV (BMV1), TP2 and LP2 are the top and left templates of the second-best block MV (BMV2).

$$\text{Fused left template} = w1 * LP1 + w2 * LP2.$$

$$\text{Fused top template} = w1 * TP1 + w2 * TP2.$$

If sum of absolute differences (SAD) is used as a cost metric:

costLeftFusion=SAD between current left template and Fused left template.

costTopFusion=SAD between current top template and Fused top template.

Alternatively, SATD can be used as a cost metric.

$$\text{costFusion} = \text{costLeftFusion} + \text{costTopFusion}.$$

Then, in step 705, the fusion flag can be determined as follows

If costFusion<costP1, fusion is true, otherwise, fusion is false.

In another embodiment, one may find BMV1 and BMV2 by minimizing the costFusion (current vs fused reference template) instead of minimizing the TM cost (current vs reference template).

In another embodiment, instead of using the total cost to derive the weights, it is proposed to use the top and left template-costs adaptively to derive the weights for fusion as depicted in FIG. 8. The weights within a CU do not need to be uniform too, they can be derived adaptively.

a. Assume T1 and L1 are the top and left template costs of best block MV (BMV1), T2 and L2 are the top and left template costs of the second-best block MV (BMV2), and P1 and P2 are the predicted data corresponding to BMV1 and BMV2.

b. Condition for applying adaptive weights:
   If T1<T2 && L1<L2, then fusionAdpt (fusion adaptation) is true, otherwise fusionAdpt is false.
   If fusionAdpt is false, then use the non-adaptive weights as per equation (2).

c. Adaptive weights for regions RC1, RC2 and RC3 as depicted in FIG. 4 in current CU are derived such that:
   If fusionAdpt is true and T1<T2 && L1>L2, then weights for RC1 need to be below 0.5, weights for RC2 need to be around 0.5, and weights for RC3 need to be above 0.5.
   Final Intra Prediction, P=(Wadp*P1+(1−Wadp)*P2), where Wadp denotes the fusion weights in each of the RC1, RC2, and RC3 regions.
   If fusionAdpt is true and T1>T2 && L1<L2, then weights for RC1 need to be above 0.5, weights for RC2 need to be around 0.5, and weights for RC3 need to be below 0.5.
   Final Intra Pred, P=(Wadp*P2+(1−Wadp)*P1), wherein Wadp denotes the fusion weights in each of the RC1, RC2, and RC3 regions.

In another embodiment, adaptive weights for a current CU of size w×h are derived as follows $$wL(i,j) = 0.5 - cW * j + cH * i \tag{11}$$

$$wT(i,j) = 0.5 + cW * j - cH * i \tag{12}$$

where cH=0.25/h; cW=0.25/w. Indices j and i vary from 0 to w−1 and 0 to h−1.

d. If fusionAdpt is true and T1<T2 && L1>L2, use adaptive weights within CU of w×h as follows
   Final Intra Pred.

$$P(i,j) = (wT(i,j) * P1 + wL(i,j) * P2). \tag{13}$$

e. If T1>T2 && L1<L2, use adaptive weights within CU of w×h as follows Final Intra Pred, $$P(i,j) = (wL(i,j) * P1 + wT(i,j) * P2). \tag{14}$$

In another embodiment, all other processing steps remain the same except that adaptive weights are derived using the following equations $$wL(i,j) = 1/2 + \left(1/(4*(h-i))\right) - \left(1/(4*(w-j))\right), \tag{15}$$

$$wT(i,j) = 1/2 - \left(1/(4*(h-i))\right) + \left(1/(4*(w-j))\right). \tag{16}$$

In another embodiment, all other processing steps remain the same except that adaptive weights are derived using the following equations $$wL(i,j) = 0.5*\left(1/2 + \left(1/(4*(h-i))\right) - \left(1/(4*(w-j))\right)\right) + 0.25, \tag{17}$$

$$wT(i,j) = 0.5*\left(1/2 - \left(1/(4*(h-i))\right) + \left(1/(4*(w-j))\right)\right) + 0.25. \tag{18}$$

It is noted that all the inventions proposed in Improved Intra Template Matching can be directly applied to IBC-TM (intra block copy with template matching). The only difference is that BMV1 and BMV2 are directly derived from the IBC best TM cost and the second-best TM cost.

All the equations shown above can be implemented in floating point, but, in a low-cost implementation, integer arithmetic with LUT implementation (e.g., for division) can be used to simplify the process.

Improved Fusion of Intra Template Matching Using Sub-Pel Precision

Figure 9:
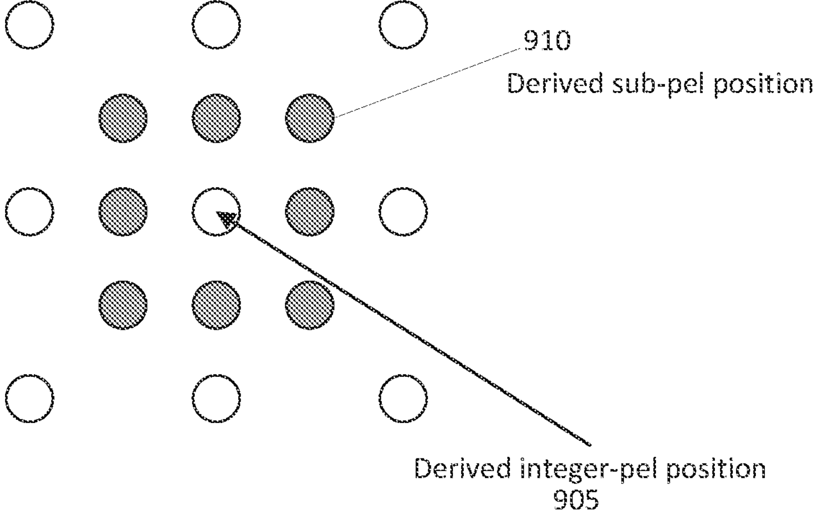
FIG. 9 depicts a sub-pel precision arrangement for intra TMP.

In Ref. [5], the fusion technique for intra TMP supports only integer-pel precision, which may limit the prediction accuracy, especially on camera-captured contents. In an example embodiment, it is proposed to apply sub-pel precision to further improve intra TMP fusion. The template matching process is not changed and the integer-pel position is derived as before. In an embodiment, as depicted in FIG. 9 (Ref. [6]), the encoder evaluates 8 additional adjacent sub-pel positions (e.g., the darker pixels) around the integer-pel position (905) in the center. A CU-level flag is signaled to indicate that sub-pel precision is enabled. If sub-pel precision is used, a separate index is signaled to indicate which sub-pel position is selected. For example, in an embodiment, without loss of generality, the index (spIdx) may range from 0 to 7, with spIdx=0 denoting the top-left candidate, and by moving left-to-right and top-to-bottom, spIdx=7 denoting the bottom-right candidate. Thus, for example, at position 910, spIdx=2.

Figure 10:
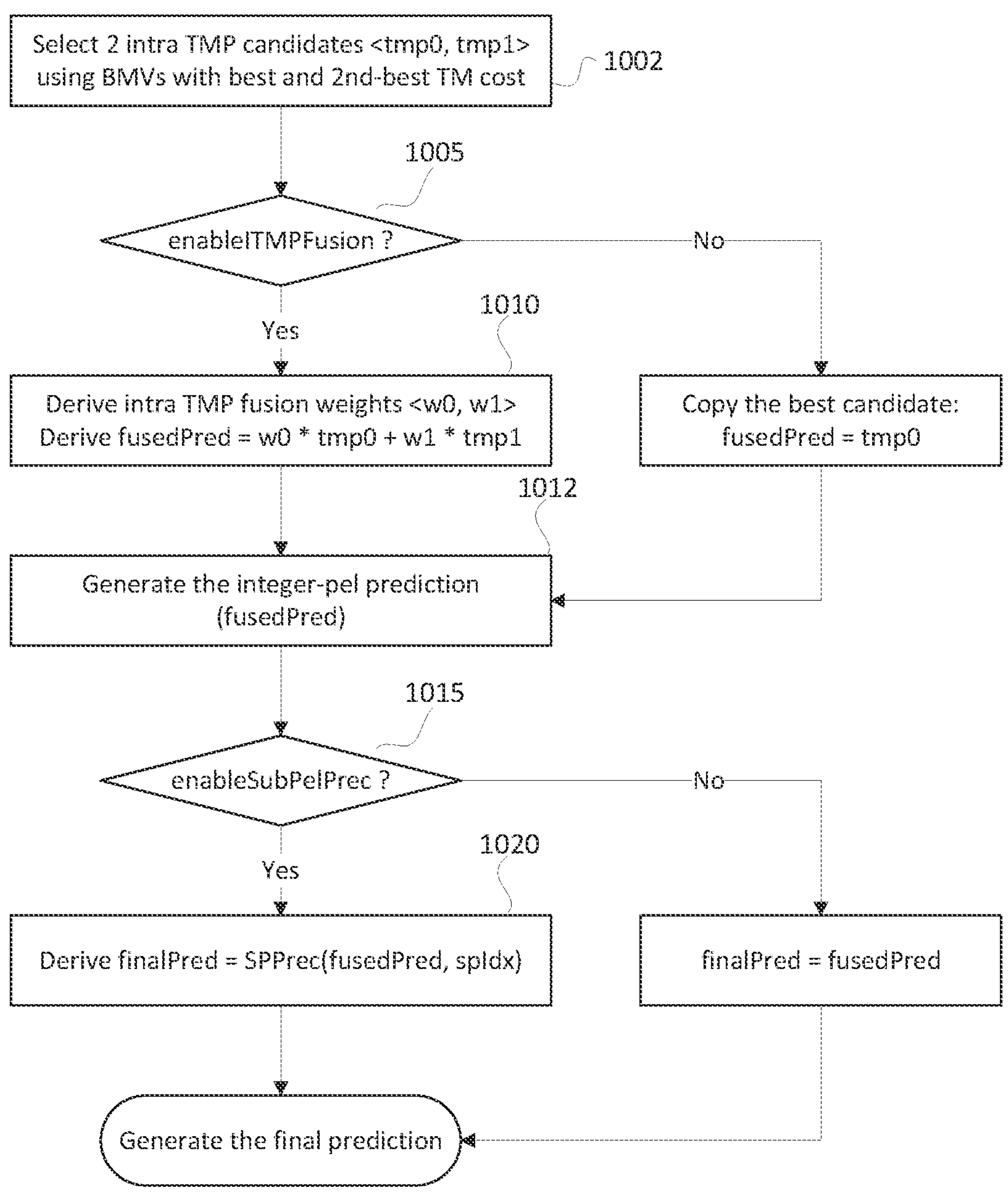
FIG. 10 depicts an example process of intra TMP fusion with sub-pel precision according to an embodiment of this invention.

In one example embodiment, as depicted in FIG. 10, given two intra TMP candidate prediction blocks (tmp0) and tmp1) (1002), selected using the block motion vectors (BMVs) with the best and second-best TM costs, if intra TMP fusion condition (1005) is satisfied (e.g., flag enableITMPFussion=1), the integer-pel prediction is derived (1012) by fusion of the two TMP candidate blocks (1010). Otherwise, the integer-pel prediction (1012) is derived from the best matched candidate block. Then, a sub-pel precision flag (1015) is checked. If sub-pel precision is enabled, the selected sub-pel precision indicated by the position index (spIdx) is applied to the fused prediction signal (1020) to obtain the final prediction block (equation (19)). Otherwise, the final prediction block is the fused prediction with integer-pel precision:

$$finalPred = SPPrec(\text{Fusion}(tmp0, tmp1), spIdx), \quad (19)$$

In equation (19), the Fusion(P0, P1) function denotes a weighted averaging of the two intra TMP candidate prediction blocks P0 and P1, using weights w0 and w1, as in $$fusedPred = w0 * P0 + w1 * P1,$$

where fusedPred denotes a fused predictor, and the weights are derived using the techniques described earlier. When sub-pel precision is enabled, given the position index (spIdx), the fused predictor (fusedPred) is further refined with sub-pel precision processing SPPrec(fusedPred, spIdx).

In an embodiment, sub-pel precision processing may be performed using a 4-tap DCT-IF interpolation filter with filter coefficients [−5, 37, 37, −5] (Ref. [6]). For example, in ECM, the SPPrec(src, spIdx) function is implemented using the following pseudocode.

```
Inputs: src[x,y], pixels values of prediction block at integer position, the location of the sub-
pel position (e.g., spIdx) in [0, 7] , f[i], i=0 to 3, coefficients of the interpolation filter.
Output dst[x,y], pixel values of prediction block at sub-pel position.
  If itmp_subpel_prec_dir = LEFT_HALF_POS (0)                                  // left
       dst[x, y] = (f[0] * src[x−2, y] + f[1] * src[x−1, y] + f[2] * src[x, y] + f[3] * src[x+1, y] + 32) >> 6;
  If itmp_subpel_prec_dir = RIGHT_HALF_POS (1)                                 // right
       dst[x, y] = (f[0] * src[x−1, y] + f[1] * src[x, y] + f[2] * src[x+1, y] + f[3] * src[x+2, y] + 32) >> 6;
  If itmp_subpel_prec_dir = ABOVE_HALF_POS (2)                                 // top
       dst[x, y] = (f[0] * src[x, y−2] + f[1] * src[x, y−1] + f[2] * src[x, y] + f[3] * src[x, y+1] + 32) >> 6;
  If itmp_subpel_prec_dir = BOTTOM_HALF_POS (3)                                // bottom
       dst[x, y] = (f[0] * src[x, y−1] + f[1] * src[x, y] + f[2] * src[x, y+1] + f[3] * src[x, y+2] + 32) >> 6;
  // horizontal filtering
  If itmp_subpel_prec_dir = ABOVE_LEFT_HALF_POS (4) | | LEFT_BOTTOM_HALF_POS (6)   //
  left
       temp = (f[0] * src[x−2, y] + f[1] * src[x−1, y] + f[2] * src[x, y] + f[3] * src[x+1, y] + 32) >> 6;
  If itmp_subpel_prec_dir = ABOVE_RIGHT_HALF_POS (5) | | RIGHT_BOTTOM_HALF_POS (7)   //
  right
       temp = (f[0] * src[x−1, y] + f[1] * src[x, y] + f[2] * src[x+1, y] + f[3] * src[x+2, y] + 32) >> 6;
  // vertical filtering
  If itmp_subpel_prec_dir = ABOVE_LEFT_HALF_POS (4) | | ABOVE_RIGHT_HALF_POS (5)   //
  top
    dst[x, y] = (f[0] * temp[x, y−2] + f[1] * temp[x, y−1] + f[2] * temp[x, y] + f[3] * temp[x, y+1] +
  32) >> 6;
  If itmp_subpel_prec_dir = LEFT_BOTTOM_HALF_POS (6) | | RIGHT_BOTTOM_HALF_POS
(7)   // bottom
dst[x, y] = (f[0] * temp[x, y−1] + f[1] * temp[x, y] + f[2] * temp[x, y+1] + f[3] * temp[x, y+2] + 32) >> 6;
```

Note:
In this implementation, from top-left to bottom-right, in FIG. 9, spIdx = [4, 2, 5, 0, 1, 6, 3, 7]. Thus, for example, at position 910, spIdx = 5.

Figure 11:
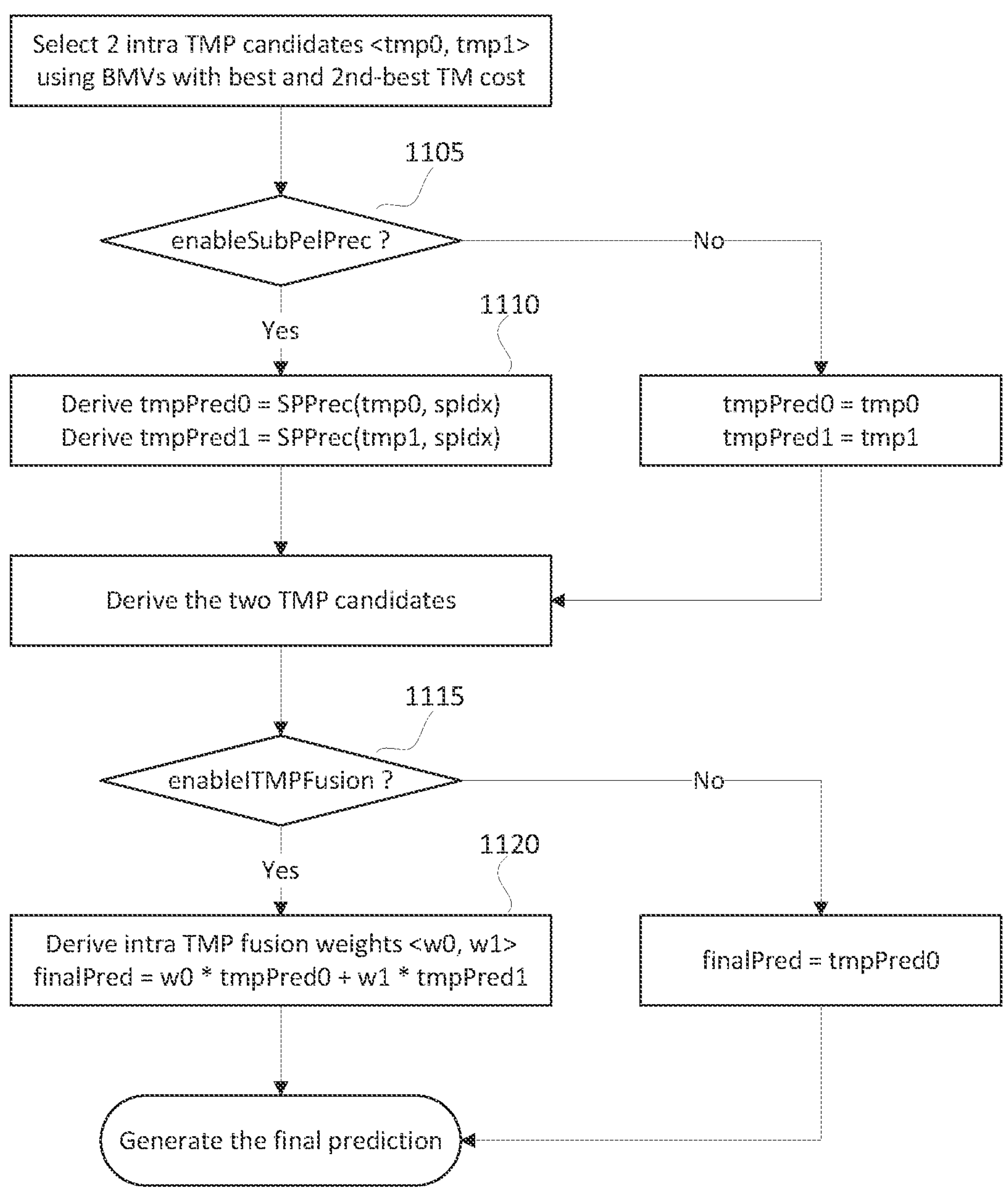
FIG. 11 depicts a second example process of intra TMP fusion with sub-pel precision according to an embodiment of this invention.

In another embodiment, as depicted in FIG. 11, if the sub-pel precision flag (1105) is enabled, then the selected sub-pel precision indicated by the position index is applied to the two intra TMP candidates (1110):

$$tmpPred0 = SPPrec(tmp0, spIdx)$$

$$tmpPred1 = SPPrec(tmp1, spIdx)$$

Note: for simplicity, a single sub-pel position is used for both intra TMP candidates; however, in another embodiment, one could use two separate sub-pel positions, providing greater accuracy, but at increased computational cost and index bits overhead.

If the sub-pel precision flag is not enabled, then one applies the two intra TMP candidates with integer-pel precision. The fusion condition (1115) is then checked to decide whether to apply intra TMP fusion (1120).

$$finalPred = \text{Fusion}(tmpPred0, tmpPred1). \quad (20)$$

Figure 12:
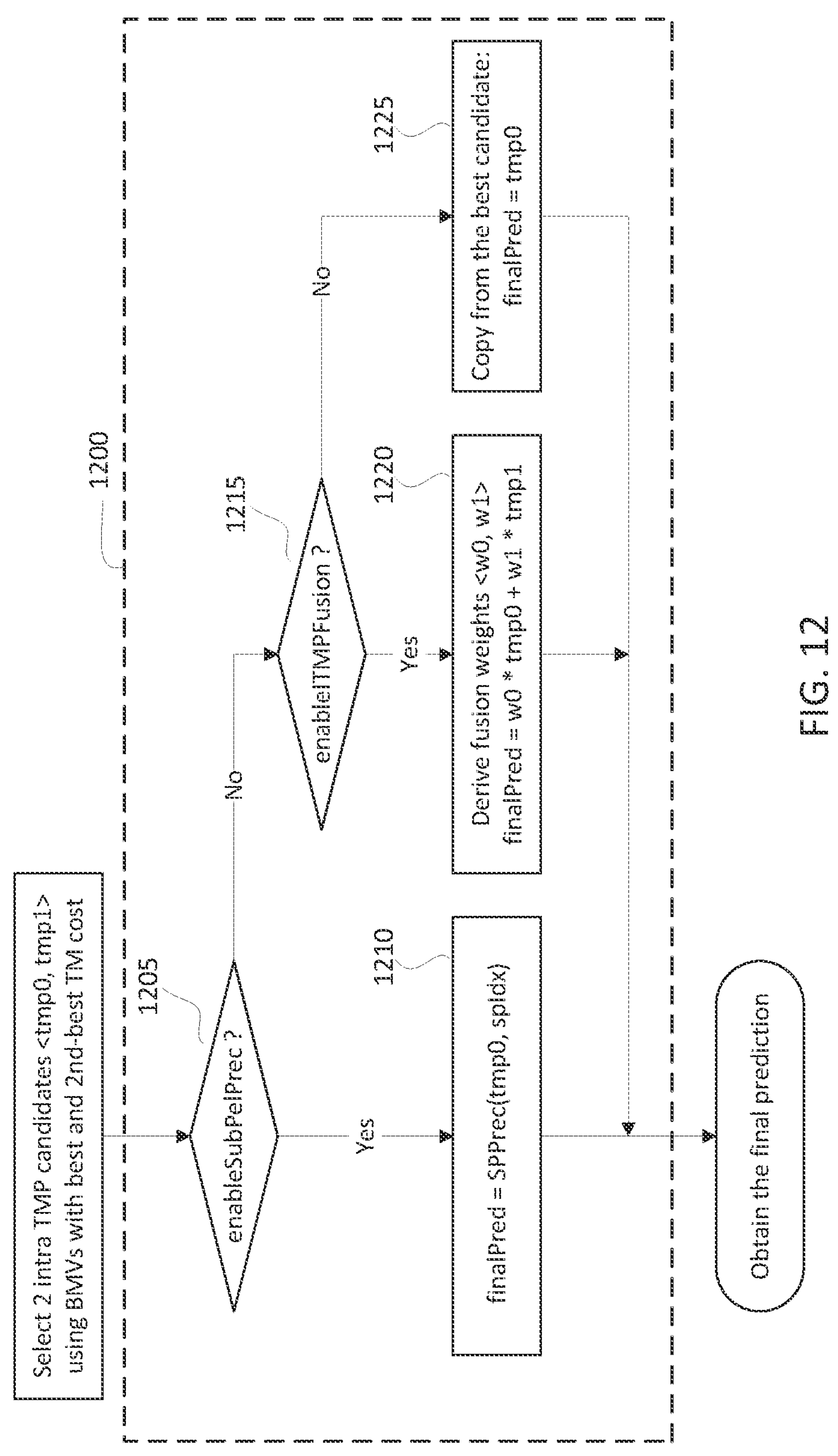
FIG. 12 depicts a third example process of intra TMP fusion with sub-pel precision according to an embodiment of this invention.

In another embodiment, as depicted in FIG. 12, if the sub-pel precision flag (1205) is enabled, then the selected sub-pel precision indicated by the position index is applied to the predicted signal generated from the best intra TMP candidate (1210). If integer-pel precision is used, then one checks the fusion condition (1215) to decide whether to apply intra TMP fusion (1220).

$$finalPred = \begin{cases} SPPrec(tmpPred, spIdx), & \text{if using sub pel precision} \\ \text{Fusion}(tmp0, tmp1), & \text{if using integer pel precision} \end{cases}. \quad (21)$$

As depicted in FIG. 12, given the best two intra TMP candidate blocks, the "sub-pel and intra TMP fusion block" (1200) will generate an output representing one of: using the best intra TMP candidate block (tmp0) (1225), using the fusion of the two intra TMP candidate blocks (1220), or using the best candidate block but with sub-pel precision (1210).

Improved Fusion of Intra Template Matching With Intra Prediction

Since the best prediction block is generated from template matching, the coding performance of Intra TMP may be limited when the template is not similar to the current block. In Ref. [7], it was proposed to fuse Intra TMP with intra prediction. The final prediction signal is the weighted sum of the prediction signals generated by Intra TMP and intra prediction signal derived using the TIMD mode. A CU-level flag is signaled indicating whether to fuse intra TMP with intra prediction.

Figure 13:
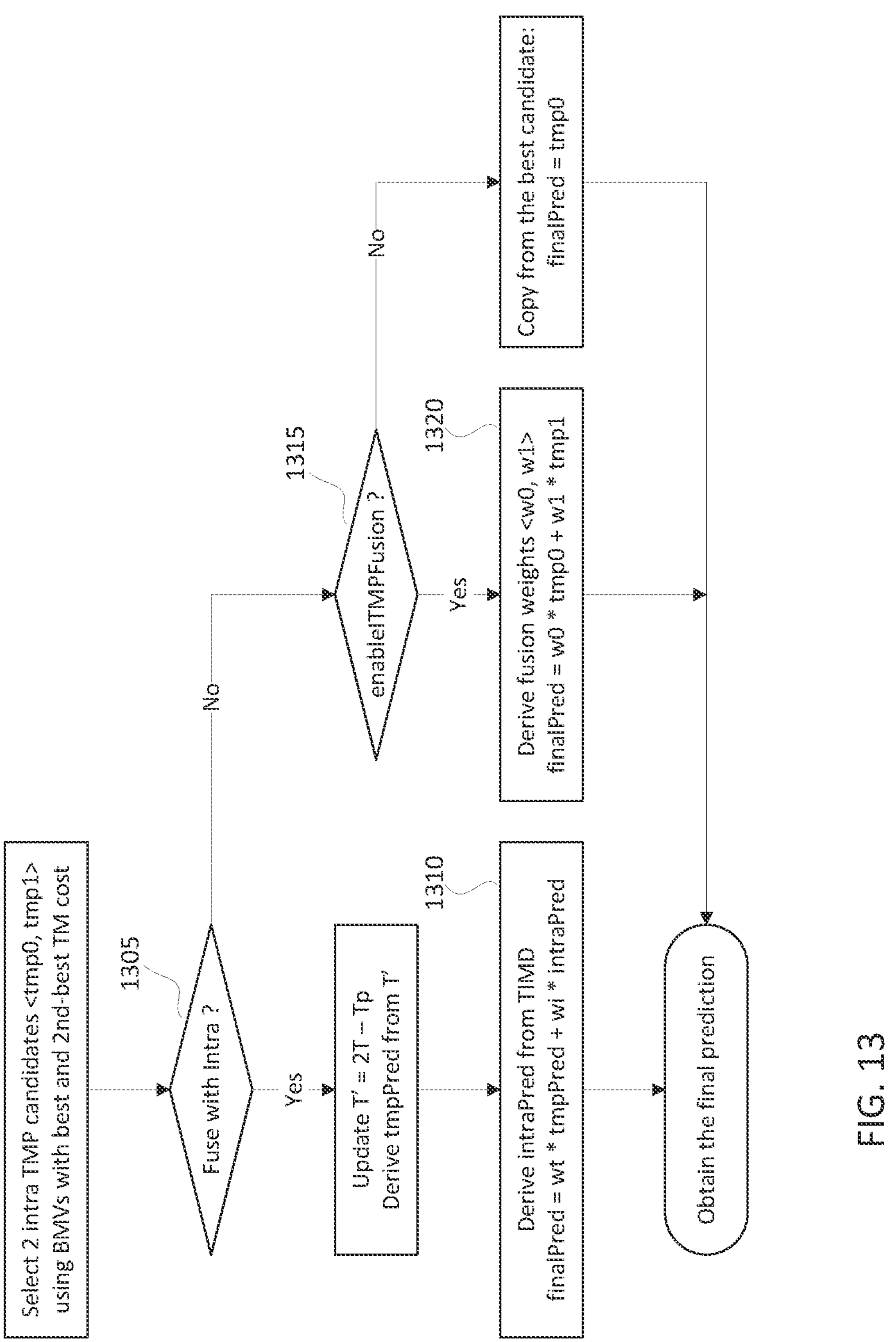
FIG. 13 depicts an example process of fusion of intra TMP with intra prediction according to an embodiment of this invention.

The process proposed by Ref. [7] can be further improved by fusing the two TMP candidates with intra prediction, to be referred for short as "fuse with intra." In an example embodiment, as depicted in FIG. 13, if a "fuse with intra" flag (1305) is enabled, then the template of the matching block for intra TMP is modified as:

$$T'(x, y) = 2 * T(x, y) - T_p(x, y), \tag{22}$$

where T is the original template and $T_p$ is derived using the TIMD mode. The prediction signal generated by Intra TMP is then fused with the intra prediction signal derived by TIMD with predefined fusion weights (1310):

$$finalPred = w_{tmp} \cdot tmpPred + w_{intra} \cdot intraPred. \tag{23}$$

For example, without limitation, in an embodiment, $w_{tmp}=13/16$ and $w_{intra}=3/16$. If the "fuse with intra mode" flag is not enabled, then the fusion condition (1315) is checked to decide whether to apply the intra TMP fusion approach (1320) alone, otherwise, finalPred is derived based on tmp0, the best intra TMP candidate.

Figure 14:
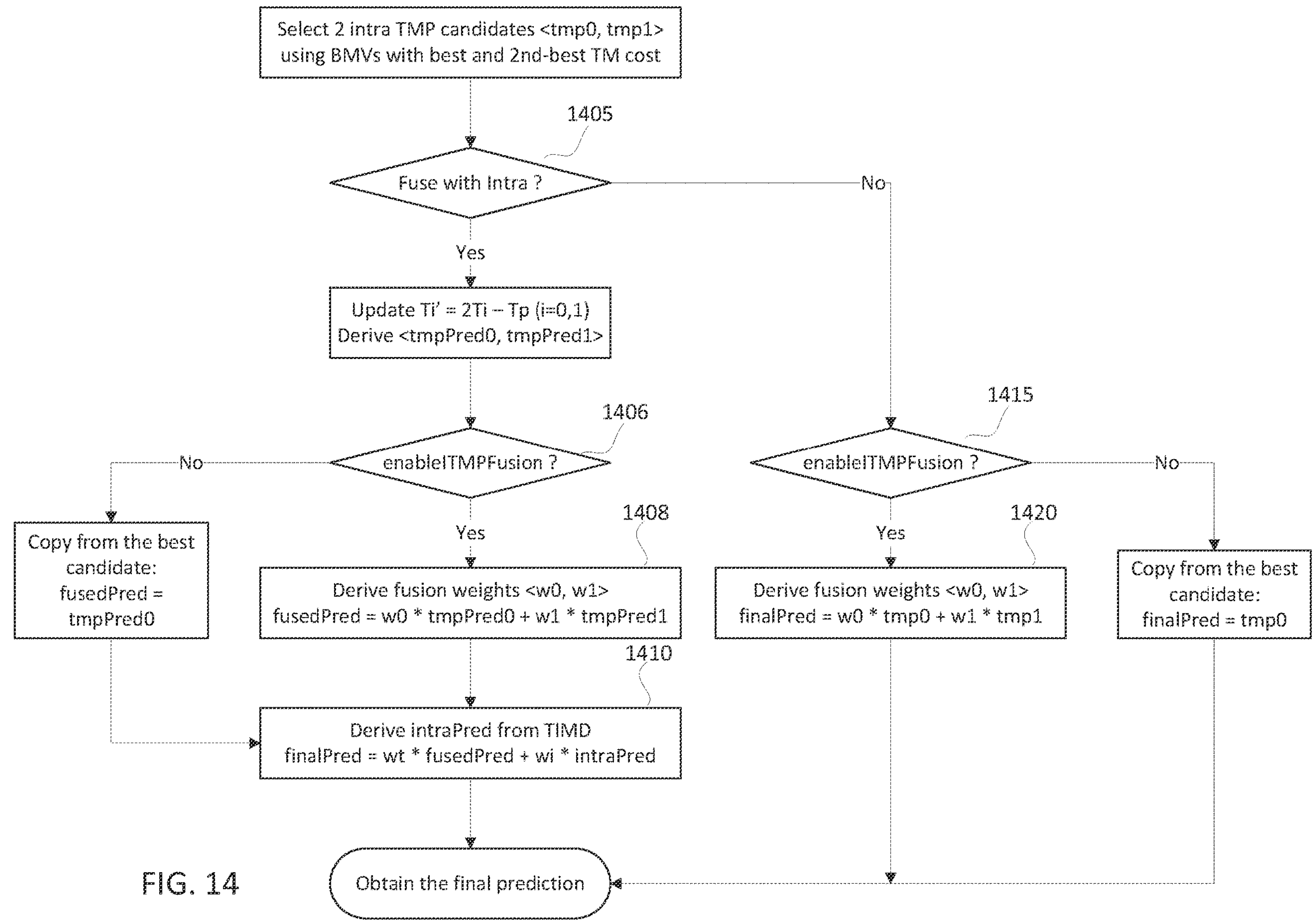
FIG. 14 depicts another example process of fusion of intra TMP with intra prediction according to an embodiment of this invention.

In FIG. 13, intra TMP fusion is enabled only if "fuse with intra" is not enabled. In another embodiment, as depicted in FIG. 14, intra TMP fusion may also be enabled when "fuse with intra" is enabled. If fuse with intra (1405) is enabled, the templates of the two matching blocks (i=0, 1) for intra TMP fusion are modified as:

$$T_i' = 2 * T_i - T_p, \tag{24}$$

and two new temporary TMP candidates are derived (e.g., tmpPred0 and tmpPred1), where $T_p$ is derived from TIMD. If Intra TMP fusion is enabled (1406), intra TMP fusion is performed in step 1408, where $$fusedPred = w_0 \cdot tmpPred0 + w_1 \cdot tmpPred1. \tag{25}$$

Then, in step (1410), the fused prediction signal generated by Intra TMP fusion (1408) is further fused with the intra prediction signal derived by TIMD with predefined weights:

$$finalPred = w_{tmp} \cdot fusedPred + w_{intra} \cdot intraPred \tag{26}$$

If the "fuse with intra mode" flag is not enabled, then the intra TMP fusion condition (1415) is checked to decide whether to apply the intra TMP fusion approach (1420) or not.

In another embodiment, the fusion process is similar as the previously described methods. However, the intra TMP process uses an unchanged template, which is same as that used in ECM 7.

In another embodiment, the fusion process is similar as the previously described methods: however, the search process for the two TMP candidates is done in an iterative way. In the first search pass, the best matching block with the lowest TM cost is selected. Then, in the second search pass, the template of the second-best matching block is modified as:

$$T_{2nd}' = 2 * T_{2nd} - T_{best}, \tag{27}$$

where $T_{best}$ is derived from the best matching block selected from the first search pass.

In another embodiment, the fusion weights used to fuse intra TMP fusion and intra prediction ($w_{tmp}$, $w_{intra}$) are derived based on the template cost (e.g., SAD) defined as:

$$w_{intra} = costFusion/(costFusion + costTIMD) \tag{28}$$

$$w_{tmp} = 1 - w_{intra}$$

The fusion process described in previous methods can be further combined with the sub-pel precision technique. An example syntax is depicted in Table 1, where syntax elements in Italic denote new syntax over the existing ECM syntax.

Note that there is no need for signaling whether Intra TMP fusion is enabled, since, as discussed earlier, this flag can be derived based on the best and second-best template matching costs (e.g., see FIG. 7).

TABLE 1

Example syntax of enhancements to Intra TMP

| Syntax | Description |
|---|---|
| ... | |
| intra_tmp_flag | Check if Intra TMP is enabled |
| if (intra_tmp_flag) { | If intra TMP is enabled: |
| itmp_template_update_flag | Check if the Template is updated |
| itmp_subpel_prec_flag | Check if sub-pel precision is enabled |
| if(itmp_subpel_prec_flag) { | if sub-pel precision is enabled |
| itmp_subpel_prec_dir | Read position of intra TMP sub-pel |
| } | |
| } | |
| ... | |

Figure 15:
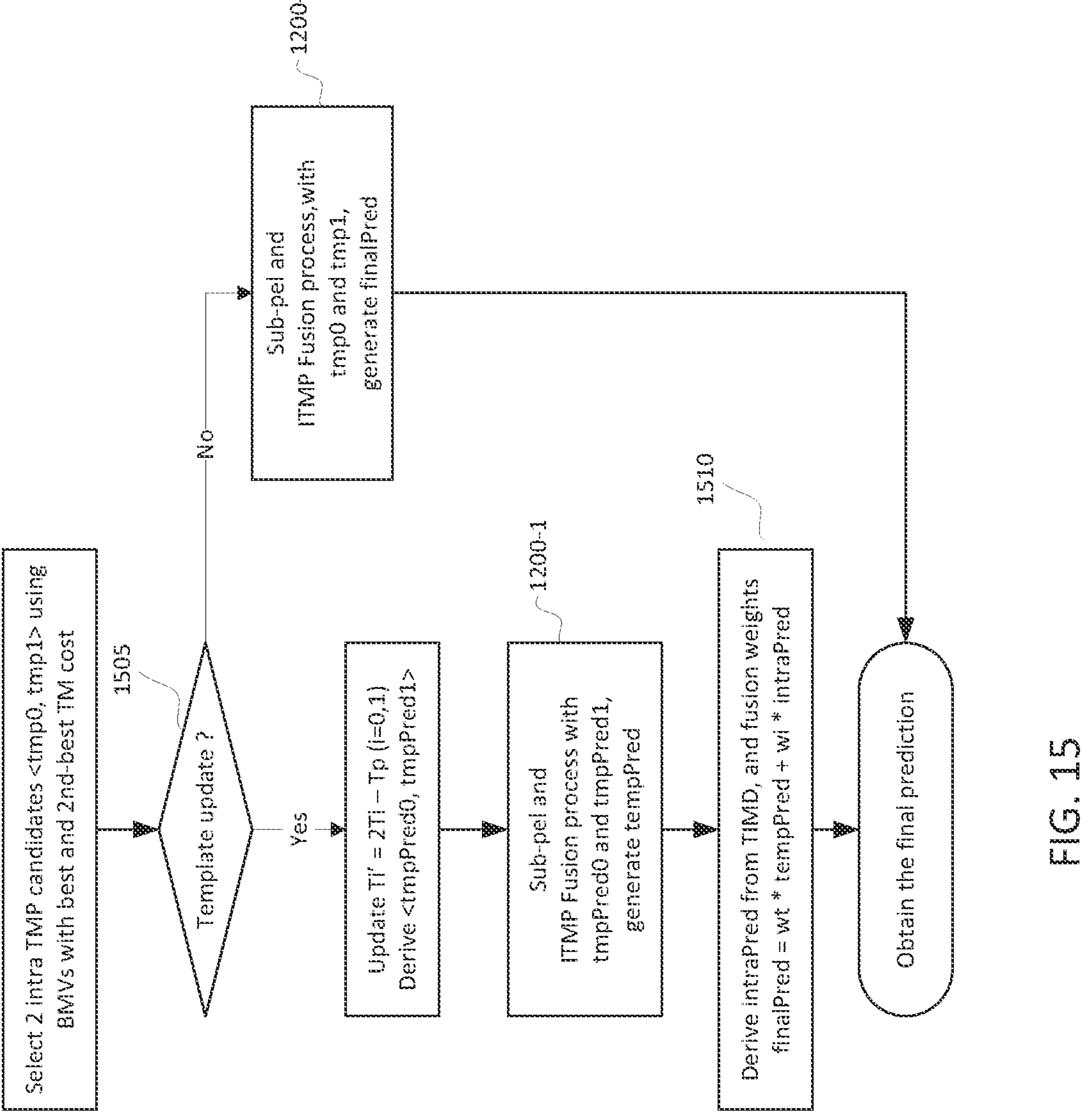
FIG. 15 depicts an example process of fusion of intra TMP with intra prediction combined with sub-pel precision.

In an example embodiment, as depicted in FIG. 15, two TMP candidates are first selected from the template searching process. If the template update flag is enabled (1505) (e.g., itmp_template_update_flag=1), the templates of the two candidates are modified based on the TIMD mode. Then, as depicted in FIG. 12 for block 1200-1, the sub-pel precision flag (e.g., itmp_subpel_prec_flag) is checked. If sub-pel precision is applied (e.g., itmp_subpel_prec_flag=1), then the best TMP candidate is refined based on the selected sub-pel position to generate prediction block tempPred. Next (1510), the tempPred values are fused with TIMD derived intra prediction to generate the final prediction. Otherwise, if integer-pel precision is applied (e.g., itmp_subpel_prec_flag=0), the two TMP candidates are directly fused with TIMD derived intra prediction to generate the final predicted signal. If the template update flag is not enabled, then the process continues with the sub-pel and ITMP fusion process of block 1200-2. That is, as depicted in FIG. 12, if sub-pel precision is used, the final prediction may be the best TMP candidate refined with the selected sub-pel position. Otherwise, if integer-pel precision is used, the final prediction is a weighted sum of the two TMP candidates.

Figure 16:
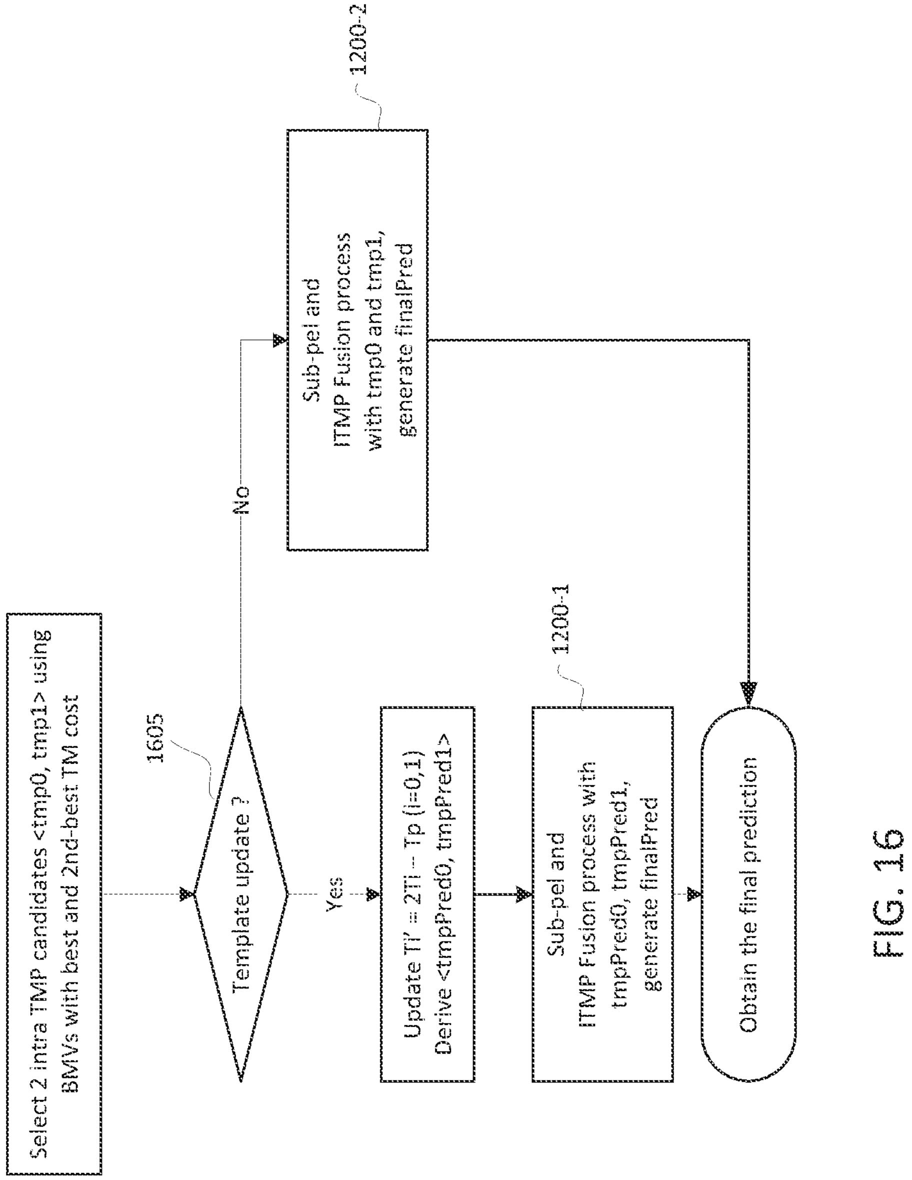
FIG. 16 depicts an example process of fusion of intra TMP with updated template combined with sub-pel precision.

In another embodiment, as depicted in FIG. 16, the main workflow is similar as the one described in FIG. 15. The only difference is when the template update flag (1605) is enabled, the final process of fusion with TIMD derived intra prediction (1510) is skipped. In this case, only the templates are modified compared with the case when template update flag is disabled.

In another embodiment, an alternative template updating method defined by equation (27) can be applied to the fusion approaches proposed in FIG. 15 and FIG. 16.

Local Adaptive Fusion

Figure 17:
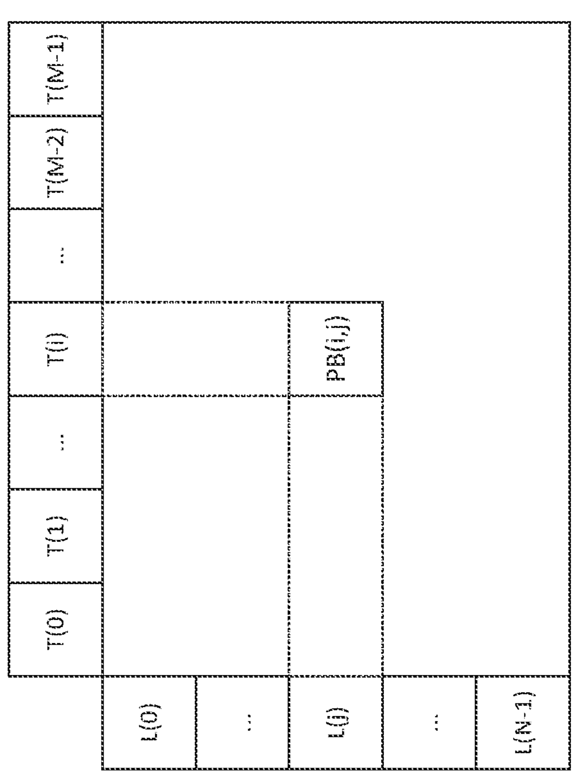
FIG. 17 depicts an example process of local adaptive fusion of intra TMP.
Figure 17:
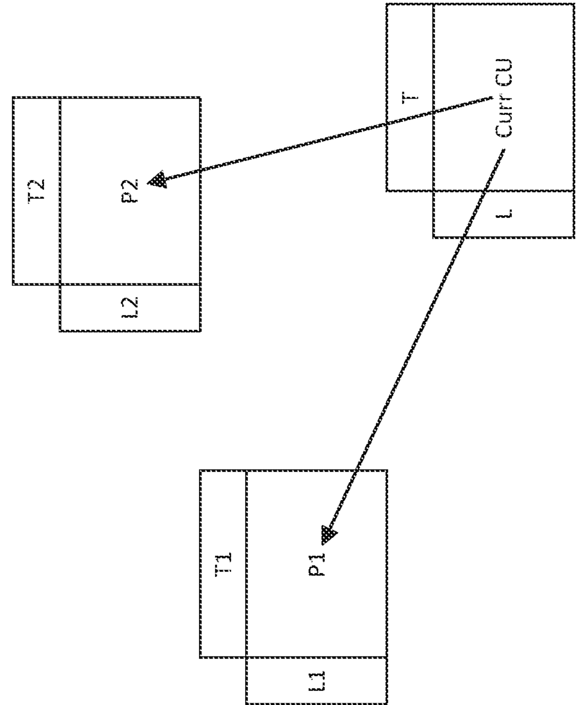

In another embodiment, instead of doing fusion of the two TMP candidates with adaptive weights based on the "global" template matching cost between the L-shaped template of the matching block and the target template of the current block, it is proposed to apply local adaptive fusion of the two TMP candidates, as depicted in FIG. 17. As discussed earlier. P1 is the predicted data corresponding to the best match with the lowest TM cost and P2 is the predicted data corresponding to the second-best match with the second-lowest TM cost.

First, the current CU is divided into a total of M×N subblocks, each of size (m×n), denoted as PB(i, j) (e.g., m=n=4 or 8). As depicted in FIG. 17, the left template (L) is subdivided into N smaller templates (L(j), j=0, 1, . . . N−1), and the top template (T) is subdivided to M smaller templates (T(i), i=0, 1, . . . M−1). For each subblock PB(i, j), where i=0, 1, . . . , M−1 and j=0, 1, . . . N−1, one computes the local template matching costs CostTx(i) and CostLx(j), where x=1 for TM with P1 and x=2 for TM with P2, (e.g., using SAD/SATD) using the partial top template T(i) and the partial left template L(j) respectively. Then, the final prediction of the current subblock PB(i, j) is a weighted sum, with the weights derived based on the partial template costs CostPB1(i, j) and CostPB2(i, j). CostPB1(i, j) corresponds to the lowest (best) template sub-cost using L(j) and T(i), and CostPB2(i, j) corresponds to the second-best template sub-cost using L(j) and T(i). That is:

$$\text{Final Prediction: } PB(i,j) = w1 * PB1(i,j) + w2 * PB2(i,j) \tag{29}$$

$$\text{Fusion weights: } w1 = \text{Cost}PB2(i,j)/(\text{Cost}PB1(i,j) + \text{Cost}PB2(i,j)), \tag{30}$$

$$w2 = 1 - w1,$$

where PB1(i,j) and PB2(i,j) denote the sub-blocks in P1 and P2 corresponding to PB(i,j), and $$\text{Cost}PB1(i,j) = \text{Cost}T1(i) + \text{Cost}L1(j), \tag{31}$$

$$\text{Cost}PB2(i,j) = \text{Cost}T2(i) + \text{Cost}L2(j), \tag{32}$$

where CostT1(i) and CostL1(j) denote partial costs used to compute the lowest cost to select block PB1 based on L(j) and T(i), and CostT2(i) and CostL2(j) denote partial costs to compute the second-best cost to select block PB2 based on L(j) and T(i).

In another embodiment, instead of subdividing the current CU with non-overlapping blocks PB(i, j), it is proposed to do subblock-based, local adaptive fusion of intra TMP, with an overlap window. For example, PB(i, j) blocks may overlap by 1-pel for 4×4 subblocks or by 2-pels for 8×8 subblocks, to maintain continuity between two neighbor subblocks. For the overlapping area, it is proposed to use a blending method with either fixed weights or with adaptive weights based on the partial template cost of the best-matching block P1. For example:

$$\text{Blended Prediction: } PB'(i,j) = \alpha 1 * PB(i-1,j) + \alpha 2 * PB(i,j), \tag{33}$$

$$\text{Blending weights:} \tag{34}$$

$$\alpha 1 = \text{Cost}PB1(i,j)/(\text{Cost}PB1(i-1,j) + \text{Cost}PB1(i,j)),$$

$$\alpha 2 = 1 - \alpha 1,$$

where PB(i−1, j) and PB(i, j) denote the prediction sample derived using local adaptive fusion from Eq. (29) for the previous left subblock and current subblock, respectively. CostPB1(i−1, j) and CostPB1(i, j) denote the partial template cost of the best matching block PB1 corresponding to previous left subblock and current subblock, respectively. Alternatively, one may use fixed blending weights α1=α2=0.5. The vertical blending process is similar as the horizontal process, but uses vertically adjacent blocks (e.g., PB(i,j) and PB(i, j−1)).

In another embodiment, instead of using template matching cost, the adaptive weights used for intra TMP fusion can be derived from a pre-defined table based on offline training. The encoder will select from the table which pair of weights are used for final intra TMP fusion based on the Rate-Distortion optimization process. An index to the table may be signaled for each subblock to indicate the selected weights. To reduce the encoder complexity, the selection of fusion weights for each subblock can be inherited from neighboring CUs within the same CTU.

REFERENCES

Each one of the references listed herein is incorporated by reference in its entirety. The term JVET refers to the Joint Video Experts Team of ITU-T SG 16 WP 3 and ISO/IEC JTC 1/SC 29.

[1] "Versatile Video Coding," Rec. ITU-T H.266. August 2020.

[2] JVET-AA2025, "Algorithm description of Enhanced Compression Model 6 (ECM 6)," M. Coban et al., teleconference, July 2022.

[3] JVET-W0123, "EE2-related: Fusion for template-based intra mode derivation," K. Cao, et al., teleconference, July 2021.

[4] JVET-AB0130, "EE2-1.14: IntraTMP adaptation for camera-captured content," K, Naser, et al., Mainz, Germany, October 2022.

[5] JVET-AC0107, "AHG12: Fusion of Intra Template Matching," J. R. Arumugam, et al., teleconference, January 2023.

[6] JVET-AC0087, "Non-EE2: Intra TMP with half-pel precision," X. Li, et al., teleconference, January 2023.

[7] JVET-AC0170, "Non-EE2: Fuse intra template matching prediction with intra prediction," Y. Wang, et al., teleconference, January 2023.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to applying template matching in image and video coding, such as those described herein. The computer and/or IC may compute any of a variety of parameters or values that relate to applying template matching in image and video coding described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to applying template matching in image and video coding as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs. DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to applying template matching in image and video coding are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following Enumerated Example Embodiments (EEEs):

EEE1. A method for intra prediction using template matching, the method comprising:

accessing a current block and a template region of the current block, the template region comprising a top template and a left template:

determining a best matching block for the current block using intra prediction with template matching, wherein T1 and L1 denote the top and left-template matching costs between the current block and the best matching block, and P1 denotes corresponding intra-prediction data:

determining a second-best matching block for the current block using intra prediction with template matching, wherein T2 and L2 denote the top and left-template matching costs between the current block and the second-best matching block, and P2 denotes corresponding intra-prediction data:

setting a fusion flag to true if (T1<T2 and L1<L2), wherein, if the fusion flag is true, performing adaptive fusion comprising:

determining fusion weights for one or more pixels in the current block; and applying the fusion weights to the P1 and P2 data to generate fused intra-prediction data P as a weighted sum of the P1 and the P2 data.

EEE2. The method of EEE1, further comprising:

dividing the current block into an upper-right region of pixels (RC3), a lower-left region of pixels (RC1), and a mid-region of pixels (RC2) in between the lower-left region and the upper-right region of pixels;

if T1<T2 and L1>L2:

determining weights for the RC1 region to be lower than 0.5:

determining weights for the RC2 region to be close to 0.5; and determining weights for the RC3 region to be larger than 0.5; and generating fused intra-prediction data P as P=(Wadp*P1+(1−Wadp)*P2);

else, if T1>T2 and L1<L2:

determining weights for the RC1 region to be larger than 0.5;

determining weights for the RC2 region to be close to 0.5; and determining weights for the RC3 region to be lower than 0.5, and generating fused intra-prediction data P as P=(Wadp*P2+(1−Wadp)*P1), wherein Wadp denotes the fusion weights in each of the RC1, RC2, and RC3 regions.

EEE3. The method of EEE1 or EEE2, wherein for a current block of size w×h, determining the fusion weights comprises computing:

$$wL(i,j) = 0.5 - cW*j + cH*i,$$

$$wT(i,j) = 0.5 - cW*j - cH*i,$$

wherein cH=0.25/h, cW=0.25/w, and indices j and i vary from 0 to w−1 and 0 to h−1:

if the fusion flag is true:

if (T1<T2 and L1>L2), then generating fused intra-prediction data P as P(i,j)=(wT(i,j)*P1+wL(i,j)*P2);

else if (T1>T2 and L1<L2), then generating the fused intra-prediction data P as P(i,j)=(wL(i,j)*P1+wT(i,j)*P2).

EEE4. The method of EEE3, wherein determining the fusion weights comprises computing:

$$wL(i,j)=1/2+\left(1/(4*(h-i))\right)-\left(1/(4*(w-j))\right),$$

$$wT(i,j)=1/2-\left(1/(4*(h-i))\right)+\left(1/(4*(w-j))\right).$$

EEE5. The method of EEE3, wherein determining the fusion weights comprises computing:

$$wL(i,j)=0.5*\left(1/2+\left(1/(4*(h-i))\right)-\left(1/(4*(w-j))\right)\right)+0.25,$$

$$wT(i,j)=0.5*\left(1/2-\left(1/(4*(h-i))\right)+\left(1/(4*(w-j))\right)\right)+0.25.$$

EEE6. The method of any preceding EEE, wherein setting the fusion flag to true comprises computing:

if T1<T2 && L1<L2 && (M1!=DC||M1!=Planar||M2!=DC||M2!=Planar) is true, wherein DC and Planar denote Intra modes.

EEE7. The method of EEE1 or EEE2, wherein determining the fusion weights comprises:

dividing the current block into M×N subblocks (PB(i, j));

dividing the left template region of the current block into N left sub-templates (L(j));

dividing the top template region of the current block into M top sub-templates (T(i));

for each subblock (PB(i,j)), using its corresponding top sub-template (T(i)) and left sub-template (L(j)):

computing corresponding first sub-cost (CostPB1(i,j)) for the best matching block;

computing corresponding second sub-cost (CostPB2(i, j)) for the second-best matching block: and deriving local adaptive fusion weights for each sub-block:

$$w1=\mathrm{Cost}PB2(i,j)/(\mathrm{Cost}PB1(i,j)+\mathrm{Cost}PB2(i,j)),$$

$$w2=1-w1.$$

EEE8. The method of EEE7, wherein $$\mathrm{Cost}PB1(i,j)=\mathrm{Cost}T1(i)+\mathrm{Cost}L1(j),\text{ and}$$

$$\mathrm{Cost}PB2(i,j)=\mathrm{Cost}T2(i)+\mathrm{Cost}L2(j),$$

wherein CostT1(i) and CostL1(j) denote the template matching costs with the best matching block when using sub-templates T(j) and L(j), and CostT2(i) and CostL2(j) denote the template matching costs with the second-best matching block when using sub-templates T(j) and L(j).

EEE9. The method of EEE7, wherein applying the fusion weights to the PB1 and PB2 data to generate fused intra-prediction data PB as a weighted sum of the PB1 and the PB2 data comprises computing:

$$PB(i,j)=w1*PB1(i,j)+w2*PB2(i,j),$$

$$\text{for } i=0,1,\ldots,M-1,\text{ and } j=0,1,\ldots,N-1.$$

wherein PB1(i, j) and PB2(i,j) denote blocks in P1 and P2 corresponding to PB(i,j).

EEE10. A method for intra prediction using template matching, the method comprising:

accessing a current block and a template region of the current block, the template region comprising a top template and a left template;

determining a best matching block for the current block using intra prediction with template matching, wherein costP1 denotes an associated template cost between the current block and the best matching block for a best motion vector (BMV1), and P1 denotes corresponding intra-prediction data:

determining a second-best matching block for the current block using intra prediction with template matching, wherein costP2 denotes an associated template cost between the current block and the second-best matching block for a second-best motion vector (BMV2), and P2 denotes corresponding intra-prediction data;

setting a fusion flag to true if (costP2<Th*costP1), where Th denotes a threshold larger than 1.0, wherein, if the fusion flag is true, performing fusion comprising:

computing fusion weights w1 and w2; and generating fused intra-prediction data as P=(w1*P1+w2*P2).

EEE11. The method of EEE10, wherein computing the fusion weights comprises computing:

$$w1=\mathrm{cost}P2/(\mathrm{cost}P1+\mathrm{cost}P2),\text{ and } w2=1-w1.$$

EEE12. The method of EEE11, wherein setting the fusion flag to true comprises:

fuse reference templates corresponding to those used to generate P1 and P2, to generate a fused template;

compute a sum of absolute value differences (SAD) between the template of the current block and the fused template, to generate a fusion-related cost (costFusion); and if costFusion<costP1, then setting the fusion flag to true.

EEE13. The method of EEE12, wherein generating the fuse template and the fusion-related cost (costFusion) comprises:

computing:

$$\text{Fused left template}=w1*LP1+w2*LP2;$$

$$\text{Fused top template}=w1*TP1+w2*TP2;$$

costLeftFusion=SAD between the left template and the Fused left template;

costTopFusion=SAD between the top template and the Fused top template; and costFusion=costLeftFusion+costTopFusion, wherein TP1 and LP1 denote the top and left templates of the best matching block, and TP2 and LP2 denote the top and left templates of the second-best matching block.

EEE14. A method for intra prediction using template matching, the method comprising:

accessing a current block and a template region of the current block, the template region comprising a top template and a left template;

determining a best matching block for the current block using intra prediction with template matching, wherein T1 and L1 denote the top and left-template matching costs between the current block and the best matching block. BMV1 denotes a corresponding best motion vector, and P1 denotes corresponding intra-prediction data using BMV1;

determining a second-best matching block for the current block using intra prediction with template matching, wherein T2 and L2 denote the top and left-template matching costs between the current block and the second-best matching block, BMV2 denotes a corresponding second-best motion vector, and P2 denotes corresponding intra-prediction data using BMV2;

setting a fusion flag to true if (T1<T2 and L1<L2), wherein, if the fusion flag is true, performing adaptive fusion comprising:

determining weights for one or more pixels in the current block; and generating fused intra-prediction data P as a weighted sum of the P1 data and the P2 data.

EEE15. The method of EEE14, further comprising:

dividing the current block into an upper-right region of pixels (RC3), a lower-left region of pixels (RC1), and a mid-region of pixels (RC2) in between the lower-left region and the upper-right region of pixels;

if T1<T2 and L1>L2:

determining weights for the RC1 region to be lower than 0.5;

determining weights for the RC2 region to be close to 0.5: and determining weights for the RC3 region to be larger than 0.5; and generating fused intra-prediction data P as P=(Wadp*P1+(1−Wadp)*P2);

else, if T1>T2 and L1<L2:

determining weights for the RC1 region to be larger than 0.5;

determining weights for the RC2 region to be close to 0.5; and determining weights for the RC3 region to be lower than 0.5, and generating fused intra-prediction data P as P=(Wadp*P2+(1−Wadp)*P1), wherein Wadp denotes the weights in each of the RC1, RC2, and RC3 regions.

EEE16. The method of EEE14 or EEE15, wherein for a current block of size w×h, determining weights comprises computing:

$$wL(i, j) = 0.5 - cW * j + cH * i,$$

-continued $$wT(i, j) = 0.5 + cW * j - cH * i,$$

wherein cH=0.25/h, cW=0.25/w, and indices j and i vary from 0 to w−1 and 0 to h−1;

if the fusion flag is true:

if (T1<T2 and L1>L2), then generating fused intra-prediction data P as P(i,j)=(wT(i,j)*P1+wL(i,j)*P2):

else if (T1>T2 and L1<L2), then generating the fused intra-prediction data P as P(i,j)=(wL(i,j)*P1+wT(i,j)*P2).

EEE17. The method of EEE16, wherein determining the weights comprises computing:

$$wL(i, j) = 1/2 + \left(1/(4*(h-i))\right) - \left(1/(4*(w-j))\right),$$

$$wT(i, j) = 1/2 - \left(1/(4*(h-i))\right) + \left(1/(4*(w-j))\right).$$

EEE18. The method of EEE16, wherein determining the weights comprises computing:

$$wL(i, j) = 0.5*\left(1/2 + \left(1/(4*(h-i))\right) - \left(1/(4*(w-j))\right)\right) + 0.25,$$

$$wT(i, j) = 0.5*\left(1/2 - \left(1/(4*(h-i))\right) + \left(1/(4*(w-j))\right)\right) + 0.25.$$

EEE19. A method for intra prediction using template matching prediction (TMP), the method comprising:

selecting a best intra TMP candidate prediction block (tmp0) and a second-best intra TMP candidate prediction block (tmp1) using block motion vectors corresponding to a best and second-best template-matching costs; if intra TMP fusion is enabled (1005), then:

deriving (1012) intra TMP fusion weights and generating an integer-pel prediction block by applying the intra TMP fusion weights to the best and the second-best intra TMP candidate prediction blocks; else selecting the best intra TMP candidate prediction block (tmp0) to generate the integer-pel prediction block: and if intra sub-pel precision is enabled (1015), then:

accessing a sub-pel index indicating a sub-pel position in a neighborhood of the integer-pel prediction block; and generating a final prediction block based on the integer-pel prediction block and the sub-pel index:

else selecting the integer-pel prediction block as the final prediction block.

EEE20. The method of EEE19, wherein generating a final prediction block based on the integer-pel prediction block and the sub-pel index comprises performing pixel interpolation on pixels of the integer-pel prediction block using an interpolation filter, wherein performing horizontal and/or vertical pixel interpolation filtering depends on the sub-pel index.

EEE21. A method for intra prediction using template matching prediction (TMP), the method comprising:

selecting a best intra TMP candidate prediction block (tmp0) and a second-best intra TMP candidate prediction block (tmp1) using block motion vectors corresponding to a best cost and a second-best template-matching cost; if intra sub-pel precision is enabled (1105), then:

generating a sub-pel index indicating a sub-pel position in a neighborhood of the best intra TMP candidate prediction block (tmp0); and generating (1110) a first temporary prediction block (tmpPred0) based on the best intra TMP candidate prediction block (tmp0) and the sub-pel index: and generating (1110) a second temporary prediction block (tmpPred1) based on the second-best intra TMP candidate prediction block (tmp1) and the sub-pel index:

else selecting the best intra TMP candidate prediction block as the first temporary prediction block; and selecting the second-best intra TMP candidate prediction block as the second temporary prediction block: and if intra TMP fusion is enabled (1115), then:

deriving intra TMP fusion weights (1120) and generating a final prediction block by applying the intra TMP fusion weights to the first and the second temporary prediction blocks:

else selecting the first temporary prediction block as the final prediction block.

EEE22. A method for intra prediction using template matching prediction (TMP), the method comprising:

selecting two intra TMP candidate prediction blocks (tmp0 and tmp1) using block motion vectors corresponding to a best and second-best template-matching costs:

if intra sub-pel precision is enabled (1205), then:

accessing a sub-pel index indicating a sub-pel position in a neighborhood of the best intra TMP candidate prediction block (tmp0); and generating (1210) a final prediction block based on the best intra TMP candidate prediction block and the sub-pel index; else, if intra TMP fusion is enabled (1215), then:

deriving intra TMP fusion weights and generating the final prediction block by applying the intra TMP fusion weights to the two intra TMP candidate prediction blocks (1220):

else selecting the best intra TMP candidate prediction block (tmp0) as the final prediction block.

EEE23. The method of EEE22, wherein generating the final prediction block based on the best intra TMP prediction block and the sub-pel index comprises performing pixel interpolation on pixels of the best intra TMP prediction block using an interpolation filter, wherein performing horizontal and/or vertical pixel interpolation filtering depends on the sub-pel index.

EEE24. The method of EEE22 or EEE23, further comprising:

accessing a flag to determine whether template-updating is enabled (1605), and if template-updating is enabled (1605):

generating two updated templates for intra TMP prediction;

generating two temporary intra TMP candidate prediction blocks (tmpPred0 and tmpPred1) using block motion vectors corresponding to a best and second-best template-matching costs for the two updated templates: and if intra sub-pel precision is enabled (1205), then:

accessing a sub-pel index indicating a sub-pel position in a neighborhood of the best temporary intra TMP candidate prediction block (tmpPred0)); and generating the final prediction block based on the best temporary intra TMP candidate prediction block and the sub-pel index:

else, if intra TMP fusion is enabled, then:

deriving intra TMP fusion weights and generating the final prediction block by applying the intra TMP fusion weights to the two temporary intra TMP candidate prediction blocks:

else selecting the best temporary intra TMP candidate prediction block (tmp0) as the final prediction block.

EEE25. The method of EEE24, wherein if template-updating is enabled, further comprising:

generating an intra prediction block with TIMD;

accessing fusion weights (1510); and generating a fused final prediction block by applying a weighted average to the final prediction block and the intra prediction block with TIMD.

EEE26. A method for intra prediction using template matching prediction (TMP), the method comprising:

selecting two intra TMP candidate prediction blocks (tmp0) and tmp1) using block motion vectors corresponding to a best and second-best template-matching costs;

if intra TMP is fused with intra prediction (1305), then:

generating new templates for Intra TMP prediction as:

$$T_i' = 2 * T_i - T_p,\ i = 0,\ 1,$$

wherein $T_i$ denotes an original template and $T_p$ is derived based on intra mode using the most probable mode (TIMD):

generating an updated intra TMP prediction block based on the new templates $$T_i'$$

generating an intra prediction block based on TIMD: and generating a final intra prediction block (finalPred) as:

$$\text{final}Pred = \text{wt} * tmpPred + wi * \text{intra}Pred,$$

wherein wt and wi are weights, tmpPred denotes the updated intra TMP prediction block, and intraPred denotes the intra prediction block based on TIMD;

else:

if intra TMP fusion is enabled (1315), then:

deriving intra TMP fusion weights and generating the final intra prediction block by applying the intra TMP fusion weights to the two intra TMP candidate prediction blocks;

else selecting the best intra TMP candidate prediction block (tmp0) to generate the final intra prediction block (finalPred).

EEE27. The method of EEE26, wherein generating the updated intra TMP prediction block based on the new templates $$T_i'$$

further comprises:

deriving a first temporary Intra TMP prediction block based on $$T_0'$$

deriving a second temporary Intra TMP prediction block based on $$T_1'$$

if intra TMP fusion is enabled (1406), then:

deriving intra TMP fusion weights and generating the updated intra TMP prediction block by applying the intra TMP fusion weights to the first and second temporary Intra TMP prediction blocks;

else selecting the first temporary Intra TMP prediction block as the updated intra TMP prediction block.

EEE28. A tangible computer-readable storage medium having stored thereon computer-executable instructions for executing with one or more processors a method in accordance with any one of EEE1 to EEE27.

EEE29. An apparatus comprising a processor and configured to perform the method recited in any one of EEE1 to EEE27.

What is claimed is:

1. A method for intra prediction using template matching, the method comprising:

accessing a current block and a template region of the current block, the template region comprising a top template and a left template;

determining a best matching block for the current block using intra prediction with template matching, wherein T1 and L1 denote the top and left-template matching costs between the current block and the best matching block, and P1 denotes corresponding intra-prediction data;

determining a second-best matching block for the current block using intra prediction with template matching, wherein T2 and L2 denote the top and left-template matching costs between the current block and the second-best matching block, and P2 denotes corresponding intra-prediction data;

setting a fusion flag to true if (T1<T2 && L1<L2 && (M1!=DC||M1!=Planar||M2!=DC||M2!=Planar)), wherein, if the fusion flag is true, performing adaptive fusion comprising:

determining fusion weights for one or more pixels in the current block based on a size of the current block and a position associated with each of the one or more pixels; and applying the fusion weights to the P1 and P2 data to generate fused intra-prediction data P as a weighted sum of the P1 and the P2 data, wherein M1 and M2 denote the best and second best template-based derived intra-modes using a most probable mode (TIMD), and DC and Planar denote intra modes.

2. A method for intra prediction using template matching, the method comprising:

accessing a current block and a template region of the current block, the template region comprising a top template and a left template;

determining a best matching block for the current block using intra prediction with template matching, wherein T1 and L1 denote the top and left-template matching costs between the current block and the best matching block, and P1 denotes corresponding intra-prediction data;

determining a second-best matching block for the current block using intra prediction with template matching, wherein T2 and L2 denote the top and left-template matching costs between the current block and the second-best matching block, and P2 denotes corresponding intra-prediction data;

setting a fusion flag to true if (T1<T2 and L1<L2), wherein, if the fusion flag is true, performing adaptive fusion comprising:

dividing the current block into an upper-right region of pixels (RC3), a lower-left region of pixels (RC1), and a mid-region of pixels (RC2) in between the lower-left region and the upper-right region of pixels;

if T1<T2 and L1>L2:

determining weights for the RC1 region to be lower than 0.5;

determining weights for the RC2 region to be close to 0.5; and determining weights for the RC3 region to be larger than 0.5; and generating fused intra-prediction data P as P=(Wadp*P1+(1−Wadp)*P2);

else, if T1>T2 and L1<L2:

determining weights for the RC1 region to be larger than 0.5;

determining weights for the RC2 region to be close to 0.5; and determining weights for the RC3 region to be lower than 0.5, and generating fused intra-prediction data P as P=(Wadp*P2+(1−Wadp)*P1), wherein Wadp denotes the fusion weights in each of the RC1, RC2, and RC3 regions.

3. A method for intra prediction using template matching, the method comprising:

accessing a current block and a template region of the current block, the template region comprising a top template and a left template;

determining a best matching block for the current block using intra prediction with template matching, wherein T1 and L1 denote the top and left-template matching costs between the current block and the best matching block, and P1 denotes corresponding intra-prediction data;

determining a second-best matching block for the current block using intra prediction with template matching, wherein T2 and L2 denote the top and left-template matching costs between the current block and the second-best matching block, and P2 denotes corresponding intra-prediction data;

setting a fusion flag to true if (T1<T2 and L1<L2), wherein, if the fusion flag is true, performing adaptive fusion comprising determining fusion weights for one or more pixels in the current block, wherein for a current block of width size w and height size h, determining the fusion weights comprises computing:

$$wL(i,j)=0.5-cW*j+cH*i,$$

$$wT(i,j)=0.5+cW*j-cH*i,$$

wherein cH=0.25/h, cW=0.25/w, and indices j and i vary from 0 to w−1 and 0 to h−1;

if the fusion flag is true:

if (T1<T2 and L1>L2), then generating fused intra-prediction data P as P(i,j)=(wT(i,j)*P1+wL(i,j)*P2);

else if (T1>T2 and L1<L2), then generating the fused intra-prediction data P as P(i,j)=(wL(i,j)*P1+wT(i,j)*P2).

4. The method of claim 3, wherein determining the fusion weights comprises computing:

$$wL(i,j)=1/2+\left(1/(4*(h-i))\right)-\left(1/(4*(w-j))\right),$$

$$wT(i,j)=1/2-\left(1/(4*(h-i))\right)+\left(1/(4*(w-j))\right).$$

5. The method of claim 3, wherein determining the fusion weights comprises computing:

$$wL(i,j)=0.5*\left(1/2+\left(1/(4*(h-i))\right)-\left(1/(4*(w-j))\right)\right)+0.25,$$

$$wT(i,j)=0.5*\left(1/2-\left(1/(4*(h-i))\right)+\left(1/(4*(w-j))\right)\right)+0.25.$$

6. A method for intra prediction using template matching, the method comprising:

accessing a current block and a template region of the current block, the template region comprising a top template and a left template;

determining a best matching block for the current block using intra prediction with template matching, wherein T1 and L1 denote the top and left-template matching costs between the current block and the best matching block, and P1 denotes corresponding intra-prediction data;

determining a second-best matching block for the current block using intra prediction with template matching, wherein T2 and L2 denote the top and left-template matching costs between the current block and the second-best matching block, and P2 denotes corresponding intra-prediction data;

setting a fusion flag to true if (T1<T2 and L1<L2), wherein, if the fusion flag is true, performing adaptive fusion comprising determining fusion weights for one or more pixels in the current block, wherein determining the fusion weights comprises:

dividing the current block into M×N subblocks (PB(i,j)), wherein M denotes the number of horizontal subblocks and N denotes the number of vertical subblocks;

dividing the left template region of the current block into N left sub-templates (L(j));

dividing the top template region of the current block into M top sub-templates (T(i));

for each subblock (PB(i,j)), using its corresponding top sub-template (T(i)) and left sub-template (L(j)):

computing corresponding first sub-cost (CostPB1(i,j)) for the best matching block;

computing corresponding second sub-cost (CostPB2(i,j)) for the second-best matching block; and deriving local adaptive fusion weights for each sub-block:

$$w1=\mathrm{Cost}PB2(i,j)/(\mathrm{Cost}PB1(i,j)+\mathrm{Cost}PB2(i,j)),$$

$$w2=1-w1.$$

7. The method of claim 6, wherein $$\mathrm{Cost}PB1(i,j)=\mathrm{Cost}T1(i)+\mathrm{Cost}L1(j),\text{ and}$$

$$\mathrm{Cost}PB2(i,j)=\mathrm{Cost}T2(i)+\mathrm{Cost}L2(j),$$

wherein CostT1(i) and CostL1(j) denote the template matching costs with the best matching block when using sub-templates T(j) and L(j), and CostT2(i) and CostL2(j) denote the template matching costs with the second-best matching block when using sub-templates T(j) and L(j).

8. The method of claim 6, wherein applying the fusion weights to the PB1 and PB2 data to generate fused intra-prediction data PB as a weighted sum of the PB1 and the PB2 data comprises computing:

$$PB(i,j)=w1*PB1(i,j)+w2*PB2(i,j),$$

$$\text{for } i=0,1,\ldots,M-1,\text{ and } j=0,1,\ldots,N-1.$$

wherein PB1(i, j) and PB2(i,j) denote blocks in P1 and P2 corresponding to PB(i,j).

9. A method for intra prediction using template matching, the method comprising:

accessing a current block and a template region of the current block, the template region comprising a top template and a left template;

determining a best matching block for the current block using intra prediction with template matching, wherein T1 and L1 denote the top and left-template matching costs between the current block and the best matching block, BMV1 denotes a corresponding best motion vector, and P1 denotes corresponding intra-prediction data using BMVi;

determining a second-best matching block for the current block using intra prediction with template matching, wherein T2 and L2 denote the top and left-template matching costs between the current block and the second-best matching block, BMV2 denotes a corresponding second-best motion vector, and P2 denotes corresponding intra-prediction data using BMV2;

setting a fusion flag to true if (T1<T2 and L1<L2), wherein, if the fusion flag is true, performing adaptive fusion comprising:

dividing the current block into an upper-right region of pixels (RC3), a lower-left region of pixels (RCi), and a mid-region of pixels (RC2) in between the lower-left region and the upper-right region of pixels;

if T1<T2 and L1>L2:

determining weights for the RCi region to be lower than 0.5;

determining weights for the RC2 region to be close to 0.5; and determining weights for the RC3 region to be larger than 0.5; and generating fused intra-prediction data Pas P=(Wadp*Pi+(1−Wadp)*P2);

else, if T1>T2 and L1<L2:

determining weights for the RCi region to be larger than 0.5;

determining weights for the RC2 region to be close to 0.5; and determining weights for the RC3 region to be lower than 0.5, and generating fused intra-prediction data P as P=(Wadp*P2+(1−Wadp)*P1), wherein Wadp denotes the weights in each of the RC1, RC2, and RC3 regions.

10. A method for intra prediction using template matching, the method comprising:

accessing a current block and a template region of the current block, the template region comprising a top template and a left template;

determining a best matching block for the current block using intra prediction with template matching, wherein T1 and L1 denote the top and left-template matching costs between the current block and the best matching block, BMV1 denotes a corresponding best motion vector, and P1 denotes corresponding intra-prediction data using BMV1;

determining a second-best matching block for the current block using intra prediction with template matching, wherein T2 and L2 denote the top and left-template matching costs between the current block and the second-best matching block, BMV2 denotes a corresponding second-best motion vector, and P2 denotes corresponding intra-prediction data using BMV2;

setting a fusion flag to true if (T1<T2 and L1<L2), wherein, if the fusion flag is true, performing adaptive fusion comprising:

determining weights for one or more pixels in the current block, wherein for a current block of with size w and height size h, determining weights comprises computing:

$$wL(i, j) = 0.5 - cW * j + cH * i,$$
$$wT(i, j) = 0.5 + cW * j - cH * i,$$

wherein cH=0.25/h, cW=0.25/w, and indices j and i vary from 0 to w−1 and 0 to h−1;

if the fusion flag is true:

if (T1<T2 and L1>L2), then generating fused intra-prediction data P as P(i,j)=(wT(i,j)*P1+wL(i,j)*P2);

else if (T1>T2 and L1<L2), then generating the fused intra-prediction data P as P(i,j)=(wL(i,j)*P1+wT(i,j)*P2).

11. The method of claim 10, wherein determining the weights comprises computing:

$$wL(i, j) = 1/2 + \left(1/(4*(h-i))\right) - \left(1/(4*(w-j))\right),$$
$$wT(i, j) = 1/2 - \left(1/(4*(h-i))\right) + \left(1/(4*(w-j))\right).$$

12. The method of claim 10, wherein determining the weights comprises computing:

$$wL(i, j) = 0.5*\left(1/2 + \left(1/(4*(h-i))\right) - \left(1/(4*(w-j))\right)\right) + 0.25,$$
$$wT(i, j) = 0.5*\left(1/2 - \left(1/(4*(h-i))\right) + \left(1/(4*(w-j))\right)\right) + 0.25.$$

13. A tangible computer-readable storage medium having stored thereon computer-executable instructions for executing with one or more processors a method in accordance with claim 1.

14. An apparatus comprising a processor and configured to perform the method recited in claim 1.

* * * * *